(12) United States Patent
Lemonovich et al.

(10) Patent No.: US 8,543,774 B2
(45) Date of Patent: Sep. 24, 2013

(54) PROGRAMMABLE LOGIC APPARATUS EMPLOYING SHARED MEMORY, VITAL PROCESSOR AND NON-VITAL COMMUNICATIONS PROCESSOR, AND SYSTEM INCLUDING THE SAME

(75) Inventors: John E. Lemonovich, Bridgeville, PA (US); William A. Sharp, Cranberry Township, PA (US)

(73) Assignee: Ansaldo STS USA, Inc., Pittsburgh, PA (US)

( * ) Notice: Subject to any disclaimer, the term of this patent is extended or adjusted under 35 U.S.C. 154(b) by 301 days.

(21) Appl. No.: 13/079,962

(22) Filed: Apr. 5, 2011

(65) Prior Publication Data

US 2012/0260046 A1    Oct. 11, 2012

(51) Int. Cl.
*G06F 12/00* (2006.01)

(52) U.S. Cl.
USPC ............... 711/149; 711/147; 365/230.05

(58) Field of Classification Search
USPC ............... 711/147, 149; 365/230.05
See application file for complete search history.

(56) References Cited

U.S. PATENT DOCUMENTS

| | | | |
|---|---|---|---|
| 5,301,906 A | 4/1994 | Bodnar, II | |
| 5,408,627 A | 4/1995 | Stirk et al. | |
| 5,919,237 A | 7/1999 | Balliet | |
| 6,026,464 A | 2/2000 | Cohen | |
| 6,611,908 B2 | 8/2003 | Lentz et al. | |
| 6,772,230 B2 | 8/2004 | Chen et al. | |
| 6,799,252 B1 | 9/2004 | Bauman | |
| 7,206,891 B2 | 4/2007 | Emerson et al. | |
| 7,350,026 B2 | 3/2008 | Popescu et al. | |
| 7,363,436 B1 | 4/2008 | Yeh et al. | |
| 7,416,159 B2 | 8/2008 | Beaman et al. | |
| 7,522,978 B2 | 4/2009 | Minkowitz et al. | |
| 7,594,124 B2 | 9/2009 | Durham et al. | |
| 7,606,982 B2 | 10/2009 | Hwang et al. | |
| 7,639,561 B2 | 12/2009 | Lee et al. | |
| 7,719,892 B2 | 5/2010 | Kim et al. | |
| 7,850,127 B2 | 12/2010 | Lemonovich et al. | |
| 7,913,022 B1 * | 3/2011 | Baxter | 710/305 |
| 2003/0172225 A1 | 9/2003 | Brown | |
| 2004/0233994 A1 * | 11/2004 | Pearson | 375/240.24 |
| 2005/0268050 A1 | 12/2005 | Suh | |
| 2007/0208902 A1 | 9/2007 | Park et al. | |
| 2007/0288792 A1 | 12/2007 | Thorpe et al. | |
| 2008/0091312 A1 | 4/2008 | Katzer | |
| 2008/0183306 A1 | 7/2008 | Ashraf et al. | |
| 2008/0263287 A1 | 10/2008 | Kim | |
| 2009/0187735 A1 | 7/2009 | Lin et al. | |
| 2010/0256843 A1 | 10/2010 | Bergstein et al. | |

OTHER PUBLICATIONS

Sainrat P., et al., "The Design of the M3S : a Multiported Shared-Memory Multiprocessor", IEEE, 1992, pp. 326-335.

* cited by examiner

*Primary Examiner* — Kalpit Parikh
(74) *Attorney, Agent, or Firm* — Eckert Seamans Cherin & Mellott, LLC; Kirk D. Houser

(57) ABSTRACT

A programmable logic apparatus includes a shared memory having a first port, a second port and a third port; a first vital processor interfaced to the first port of the shared memory; and a non-vital communications processor separated from the first vital processor in the programmable logic apparatus and interfaced to the second port of the shared memory. The third port of the shared memory is an external port structured to interface an external second vital processor.

20 Claims, 15 Drawing Sheets

4

| | |
|---|---|
| VITAL EEPROM DATA IN (VP 12 COPY) | 0x602 |
| MAILBOX — 220 | 0x600 |
| VITAL EEPROM DATA IN (VP 16 COPY) | 0x502 |
| MAILBOX — 220 | 0x500 |
| VITAL PARTNER TRACK CIRCUIT MESSAGE IN (TO VP 16) | 0x482 |
| MAILBOX — 220 | 0x480 |
| VITAL INTERLOCKING CONTROLLER PEER MESSAGE IN (TO VP 16) | 0x282 |
| MAILBOX — 220 | 0x280 |
| VITAL EEPROM DATA OUT (FROM VP 12) — 226 | 0x182 |
| MAILBOX — 220 | 0x180 |
| VITAL PARTNER TRACK CIRCUIT MESSAGE OUT (EVEN BYTES FROM VP 12) — 224 | 0x102 |
| MAILBOX — 220 | 0x100 |
| VITAL INTERLOCKING CONTROLLER PEER MESSAGE OUT (EVEN BYTES, FROM VP 12) — 222 | 0x002 |
| MAILBOX — 220 | 0x000 |

| | |
|---|---|
| VITAL EEPROM DATA IN (VP 12 COPY) | 0x602 |
| MAILBOX — 220 | 0x600 |
| VITAL EEPROM DATA IN (VP 16 COPY) | 0x502 |
| MAILBOX — 220 | 0x500 |
| VITAL PARTNER TRACK CIRCUIT MESSAGE IN (TO VP 12) | 0x482 |
| MAILBOX — 220 | 0x480 |
| VITAL INTERLOCKING CONTROLLER PEER MESSAGE IN (TO VP 12) | 0x282 |
| MAILBOX — 220 | 0x280 |
| VITAL EEPROM DATA OUT (FROM VP 16) — 226 | 0x182 |
| MAILBOX — 220 | 0x180 |
| VITAL PARTNER TRACK CIRCUIT MESSAGE OUT (ODD BYTES FROM VP 16) — 224 | 0x102 |
| MAILBOX — 220 | 0x100 |
| VITAL INTERLOCKING CONTROLLER PEER MESSAGE OUT (ODD BYTES, FROM VP 16) — 222 | 0x002 |
| MAILBOX — 220 | 0x000 |

*FIG.9B*

PROGRAMMABLE LOGIC APPARATUS EMPLOYING SHARED MEMORY, VITAL PROCESSOR AND NON-VITAL COMMUNICATIONS PROCESSOR, AND SYSTEM INCLUDING THE SAME

BACKGROUND

1. Field

The disclosed concept pertains generally to programmable logic apparatus and, more particularly, to such programmable logic apparatus for both vital and non-vital data. The disclosed concept also pertains to systems including such programmable logic apparatus.

2. Background Information

In vital railroad control systems, there is frequently the need to provide a human interface and a mechanism to communicate data to other control or monitoring systems. However, it must be clearly verifiable that non-vital functions cannot affect the vital operations of the system by either inadvertent code execution or excessive system loading. It is often difficult to prove the independency of the vital and non-vital functions running on a single processor. Therefore, it is advantageous to maintain complete autonomy between these two types of processing.

Ideally, non-vital functions would be executed independent of vital functions employing separate discrete processors with only limited data exchanged therebetween. However, the addition of another physical processor and supporting circuitry adds to the cost and size of the product.

Vital control systems using plural vital processors need a mechanism to output vital data (e.g., without limitation, a vital message including plural data bytes) for transmission over a serial communication network, channel, interface or media. Such vital processors need to be able to independently compose data content and authorize a single point of transmission of vital data (e.g., a vital message) only if all such vital processors agree on the data content.

In such a vital control system, there is the need that no one vital processor be able to serially transmit complete, valid vital data (e.g., a valid vital message).

U.S. Pat. No. 7,850,127 discloses a cab signal receiver demodulator employing redundant, diverse field programmable gate arrays. A processor includes a first field programmable gate array (FPGA) having a first central processing unit (CPU) core programmed to perform a first function, and first programmable hardware logics (PHLs) programmed to perform a second function. A second FPGA includes a second CPU core programmed to perform a third function, and second PHLs programmed to perform a fourth function. A communication interface is between the first and second CPU cores. The first and second FPGAs are diverse. A portion of the first function communicates first information from the first CPU core to the second CPU core through the interface. A portion of the third function communicates second information from the second CPU core to the first CPU core through the interface, and, otherwise, the first function is substantially the same as the third function. The second function is substantially the same as the fourth function.

There is room for improvement in programmable logic apparatus.

There is also room for improvement in systems including programmable logic apparatus.

SUMMARY

These needs and others are met by embodiments of the disclosed concept, which provide a shared memory comprising a first port, a second port and a third port; a first vital processor interfaced to the first port of the shared memory; and a non-vital communications processor separated from the first vital processor in a programmable logic apparatus and interfaced to the second port of the shared memory. The third port of the shared memory is an external port structured to interface an external second vital processor.

In accordance with one aspect of the disclosed concept, a programmable logic apparatus comprises: a shared memory comprising a first port, a second port and a third port; a first vital processor interfaced to the first port of the shared memory; and a non-vital communications processor separated from the first vital processor in the programmable logic apparatus and interfaced to the second port of the shared memory, wherein the third port of the shared memory is an external port structured to interface an external second vital processor.

The first vital processor and the external second vital processor preferably communicate through a suitable interface.

The shared memory may separate the first vital processor from the non-vital communications processor.

As another aspect of the disclosed concept, a system comprises: a programmable logic apparatus comprising: a shared memory comprising a first port, a second port and a third port, a first vital processor interfaced to the first port of the shared memory, and a non-vital communications processor separated from the first vital processor in the programmable logic apparatus and interfaced to the second port of the shared memory; and a second vital processor external to the programmable logic apparatus, wherein the third port of the shared memory is an external port interfacing the second vital processor.

The programmable logic apparatus may be a first field programmable gate array; and the second vital processor may be a separate second field programmable gate array.

BRIEF DESCRIPTION OF THE DRAWINGS

A full understanding of the disclosed concept can be gained from the following description of the preferred embodiments when read in conjunction with the accompanying drawings in which:

FIGS. 9A-9B form a memory map of the multi-core memory share DPRAMs of FIG. 1.

DESCRIPTION OF THE PREFERRED EMBODIMENTS

Figure 1:
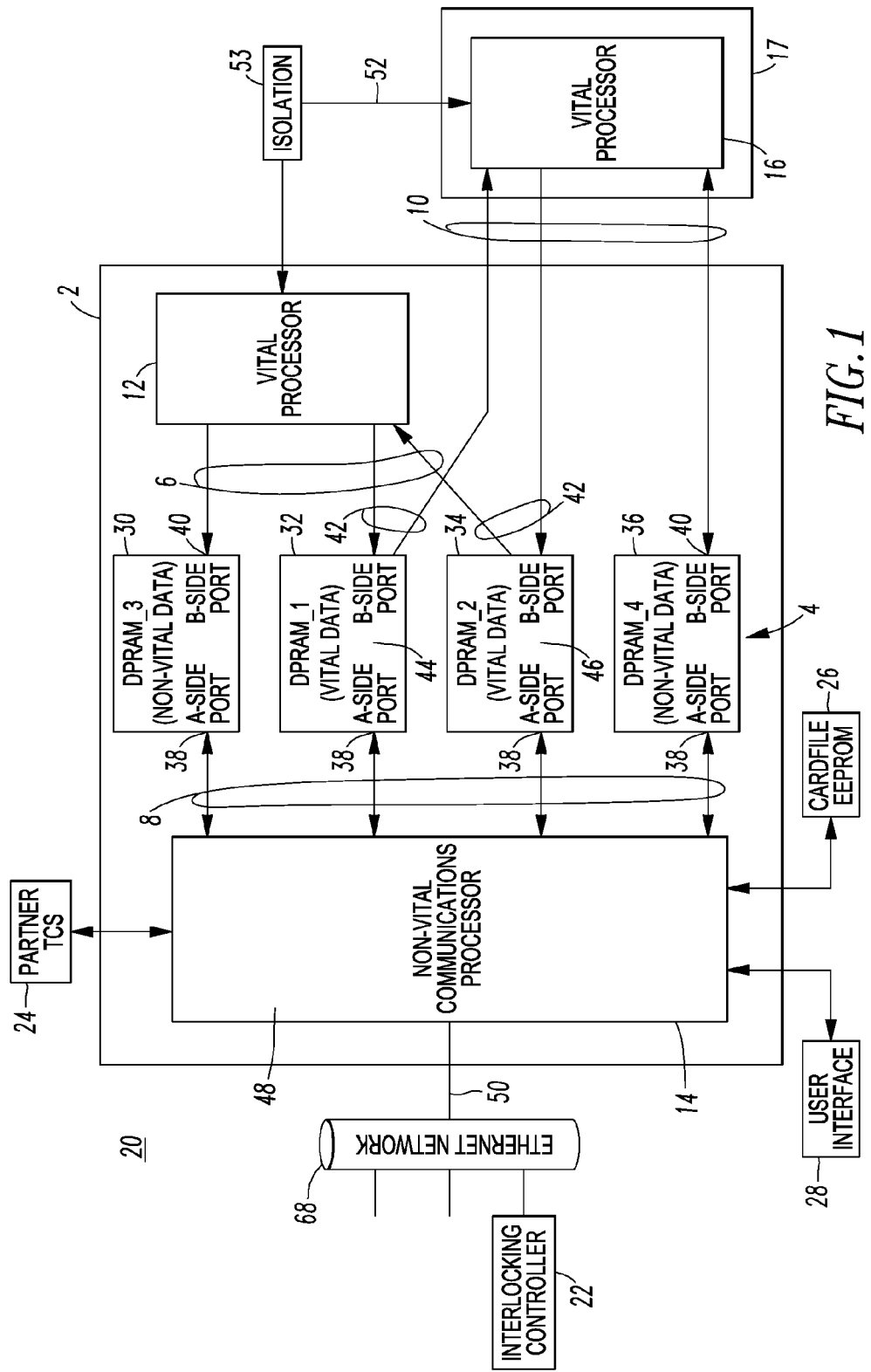
FIG. 1 is a block diagram of a programmable logic apparatus in accordance with embodiments of the disclosed concept.

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; a field programmable gate array; or any suitable processing device or apparatus.

As employed herein, the term "field programmable gate array" or "FPGA" means a semiconductor device containing programmable logic components, such as logic blocks, and programmable interconnects therebetween. Logic blocks can be programmed to perform the function of basic logic gates (e.g., without limitation, AND; OR; XOR; NOT) or relatively more complex combinational functions (e.g., without limitation, decoders; relatively simple mathematical functions; IP cores; central processing units). The FPGA logic blocks may also include memory elements. A hierarchy of programmable interconnects may allow logic blocks to be interconnected and programmed after the FPGA is manufactured to implement any logical function.

As employed herein, the term "diverse" means composed of distinct or unlike elements or qualities. For example, an FPGA made by one vendor (e.g., without limitation, Altera Corporation) is diverse from a different FPGA made by a different vendor (e.g., without limitation, Xilinx, Inc.). However, a processor made by one vendor (e.g., an 8086 made by Intel®) is not diverse from a plug-compatible, second source processor made by a different vendor (e.g., an 8086 made by AMD®).

As employed herein, the term "vital" means that the "Tolerable Hazard Rate" (THR) resulting from an abnormal outcome associated with an activity or device is less than about $10^{-9}$/hour (this is a commonly accepted hazardous event rate for vitality). That is, the Mean Time Between Hazardous Events (MTBHE) is greater than $10^9$ hours (approximately 114,000 years). For example, for a train location system to be considered vital, the uncertainty of the position is of such a value that the rate of a hazardous event resulting from a failure of the system due to that uncertainty is less than about $10^{-9}$/hour. Also, it is assumed that static data used by such a vital system, including, for example, track map data, has been validated by a suitably rigorous process under the supervision of suitably responsible parties.

As employed herein, the term "port" means a physical interface between a processor and a shared memory. A port permits read access to all or part of the shared memory by the processor, and/or permits write access to all or part of the shared memory by the processor.

As employed herein, the term "shared memory" means a memory shared by a plurality of processors.

As employed herein, the term "programmable logic apparatus" shall mean an electronic component used to build configurable or reconfigurable digital circuits. A programmable logic apparatus has an undefined function at the time of original manufacture and is programmed, configured or reconfigured before use in a corresponding circuit or system. Non-limiting examples of programmable logic apparatus include a programmable array logic (PAL), a generic array logic (GAL), a complex programmable logic device (CPLD), and a field-programmable gate array (FPGA).

The disclosed concept is described in association with a system employing MICROLOK® vital serial communication with an RS-485 interface using a MICROLOK® master/slave protocol, although the disclosed concept is applicable to a wide range of systems that serially transmit vital data through a wide range of communication networks, channels, interfaces or media using a wide range of protocols. For example, serial data communication is a fundamental mechanism to exchange information between two locations over a pair of conductors, or wirelessly. In the railroad industry, for example, serial data communication between controllers can be employed to send commands (e.g., without limitation, a desired train routing; speed information), or to report status (e.g., without limitation, signal and switch positions; track occupancy). Other examples of serial data communication include communicating a track's I.D., direction of travel, the next track circuit's frequency, line and target speed, distance-to-go, coupling and door commands, and switch positions from a controller through a suitable serial data communication interface to a train. Such a serial data communication interface can also send serial messages to the controller to report, for example, identity, health status and track occupancy.

Referring to FIG. 1, a programmable logic apparatus 2 includes a shared memory 4 having a first port 6, a second port 8 and a third port 10. A first vital processor 12 is interfaced to the first port 6. A non-vital communications processor 14 is separated from the first vital processor 12 in the programmable logic apparatus 2 and is interfaced to the second port 8. The third port 10 is an external port structured to interface an external second vital processor 16, which can be part of another FPGA 17.

A system 20 includes the programmable logic apparatus 2 and the second vital processor 16 external to the programmable logic apparatus 2. The external third port 10 interfaces the second vital processor 16.

For example and without limitation, the programmable logic apparatus 2 is a first field programmable gate array (FPGA), and the second vital processor 16 is a separate second FPGA 17. By selecting an appropriately sized FPGA or other suitable programmable logic apparatus, two isolated processors 12,14 can be instantiated within the single example FPGA 2. The shared memory 4 within the programmable logic apparatus 2 separates the first vital processor 12 from the non-vital communications processor 14. The logic components for the two processors 12,14, their supporting circuitry, and peripheral components are placed in isolated areas of the FPGA 2. By selectively routing the interconnections, the vital processor 12 is isolated to one area of the FPGA 2, and the non-vital communications processor 14 and its interface components are isolated to another area. The shared memory 4 that provides the interface between the two processors 12,14 is placed therebetween. The first vital processor 12 is diverse with respect to the external second vital processor 16.

The example non-vital communications processor 14 is structured to communicate through various interfaces to other control or monitoring systems, such as for example and without limitation, one or more of an interlocking controller 22 using a peer protocol or a master/slave protocol, a partner track circuit 24, a configuration data storage device 26, and a user interface 28.

The shared memory 4 includes a first memory 30, a second memory 32, a third memory 34 and a fourth memory 36. Each of the memories 30,32,34,36 includes a first port 38 and a second port 40 or 42. The first ports 38 of the memories 30,32,34,36 are part of the second port 8 of the shared memory 4. The second port 40 of the first memory 30 is part of the first port 6 of the shared memory 4. The second port 42 of the second memory 32 is part of the first and third ports 6,10 of the shared memory 4. The second port 42 of the third memory 34 is part of the first and third ports 6,10 of the shared memory 4. The second port 40 of the fourth memory 36 is part of the third port 10 of the shared memory 4.

The first ports 38 of the memories 30,32,34,36 are structured to permit read or write operations by the non-vital communications processor 14. The second port 40 of the first memory 30 is structured to permit read or write operations by the first vital processor 12. The second port 42 of the second memory 32 is structured to permit write operations by the first vital processor 12 and read operations by the external second vital processor 16. The second port 42 of the third memory 34 is structured to permit read operations by the first vital processor 12 and write operations by the external second vital processor 16. The second port 40 of the fourth memory 36 is structured to permit read or write operations by the external second vital processor 16. The first and fourth memories 30,36 store non-vital data. In contrast, the second and third memories 32,34 store vital data.

Both of the first vital processor 12 and the external second vital processor 16 are structured to cooperatively agree that first data 44 in the second memory 32 corresponds to second data 46 in the third memory 34, and responsively cause the non-vital communications processor 14 to employ: (a) one of the first data 44 and the second data 46 as third data 48, or (b) part of the first data 44 and part of the second data 46 as the third data 48, and to output serial data 50 based upon the third data 48.

The first vital processor 12 and the external second vital processor 16 preferably communicate through a suitable interface 52.

By utilizing logic elements that would otherwise be spare within the FPGA 2, the non-vital communications processor 14 and most of its interfacing circuitry is provided with no added reoccurring costs. Only minimal additional printed circuit board space is employed to provide a separate memory device for isolated program storage. The example processor 14 preferably runs an off-the-shelf non-vital operating system, such as Linux, that supports complex communications protocols, such as for example and without limitation, Ethernet (TCP/IP), SNMP, SLP and SPI. The example vital processors 12,16 provide tight deterministic real-time control and do not employ an operating system.

Referring to FIGS. 1, 2A-2C and 3A-3B, two soft processor cores 12,16 are employed to run a vital application and control a track circuit system (TCS). Together with other FPGA logic 19,21, these vital processors 12,16 are responsible for inter-composite item communications, interlocking controller 22 communications (via the non-vital communications processor 14), track circuit transmitter amplifier control 54, decoding incoming messages from the receivers 56, controlling and checking 58 the vital output 60, and all other application level tasks. The two vital processors 12,16 (shown as vital CPU in FIGS. 2A-2C) communicate to the non-vital communications processor 14 (shown as COM CPU in FIGS. 2A-2C) via the multi-core memory share logic 62 of FIGS. 5, 6 and 7A-7C.

Figure 3A:
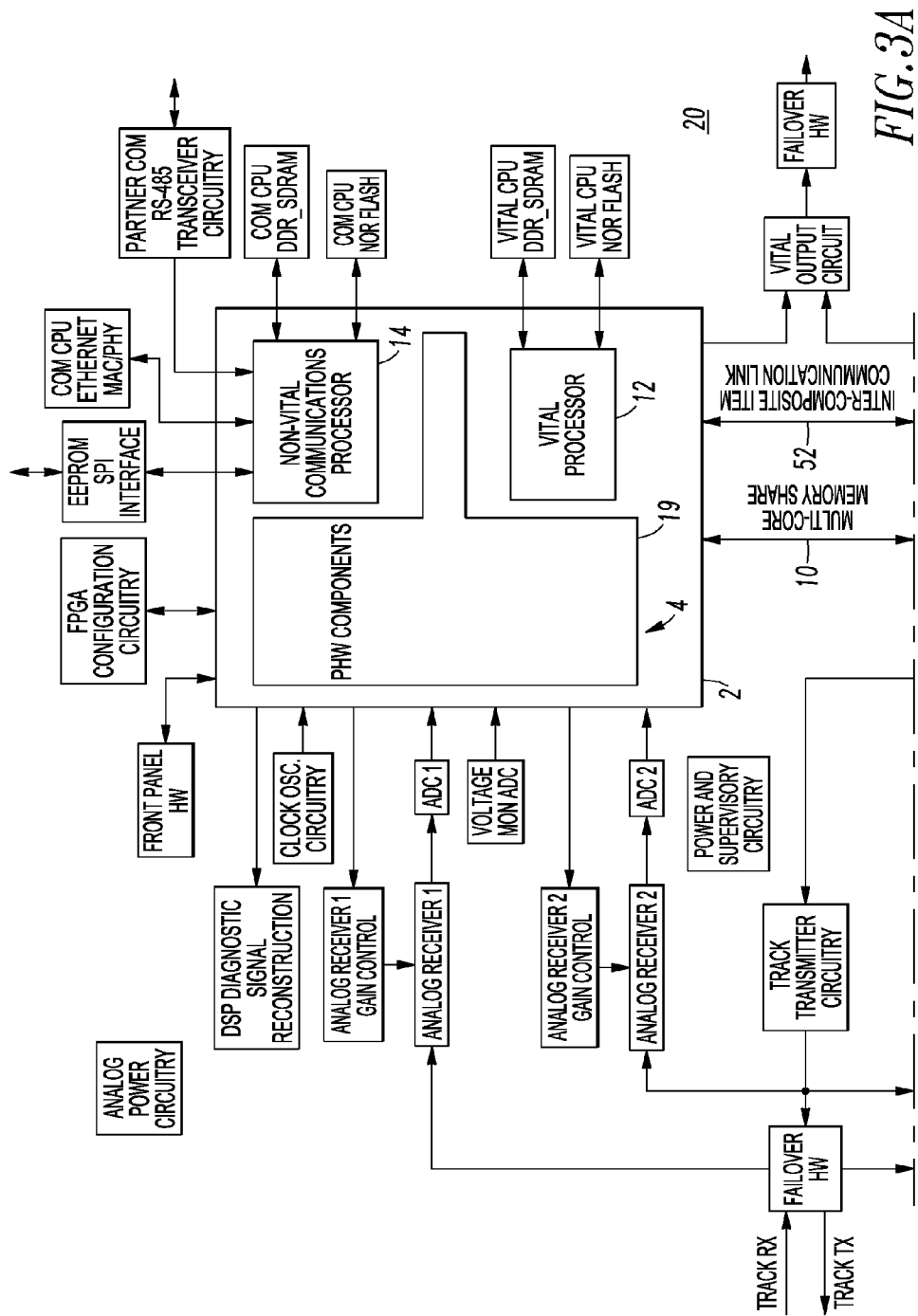
FIGS. 3A-3B form a top level block diagram of the vital communication system of FIGS. 2A-2C showing decomposition of hardware functions into components.
Figure 3B:
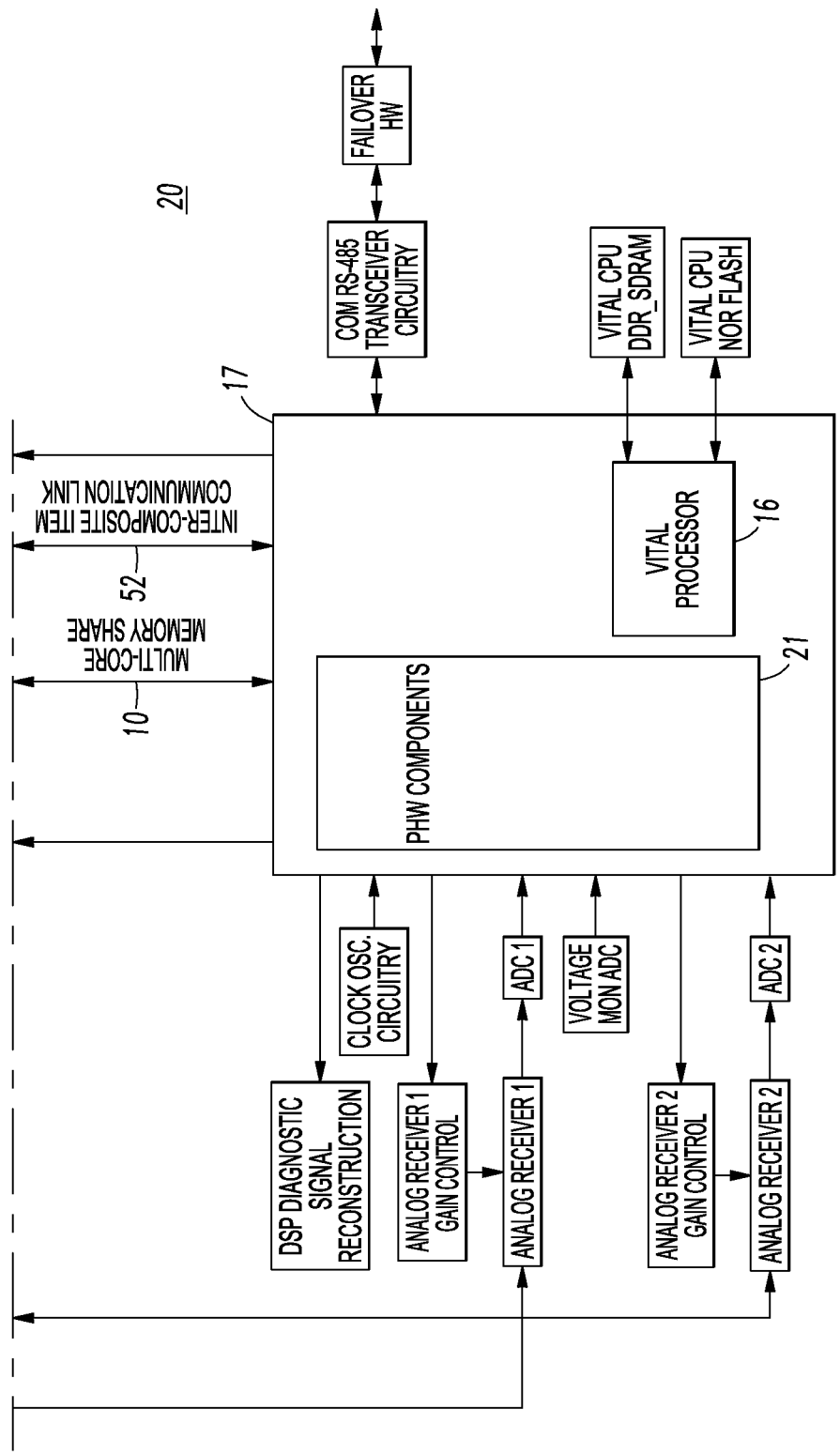

FIGS. 3A-3B shows a top level decomposition of hardware functions into components. These components can be made of a single IC, multiple ICs or passive devices, or several stages of analog and digital circuitry. The example architecture of the system 20 is implemented across two printed circuit boards (PCBs), a vital CPU daughter PCB, and an analog baseboard.

Figure 2A:
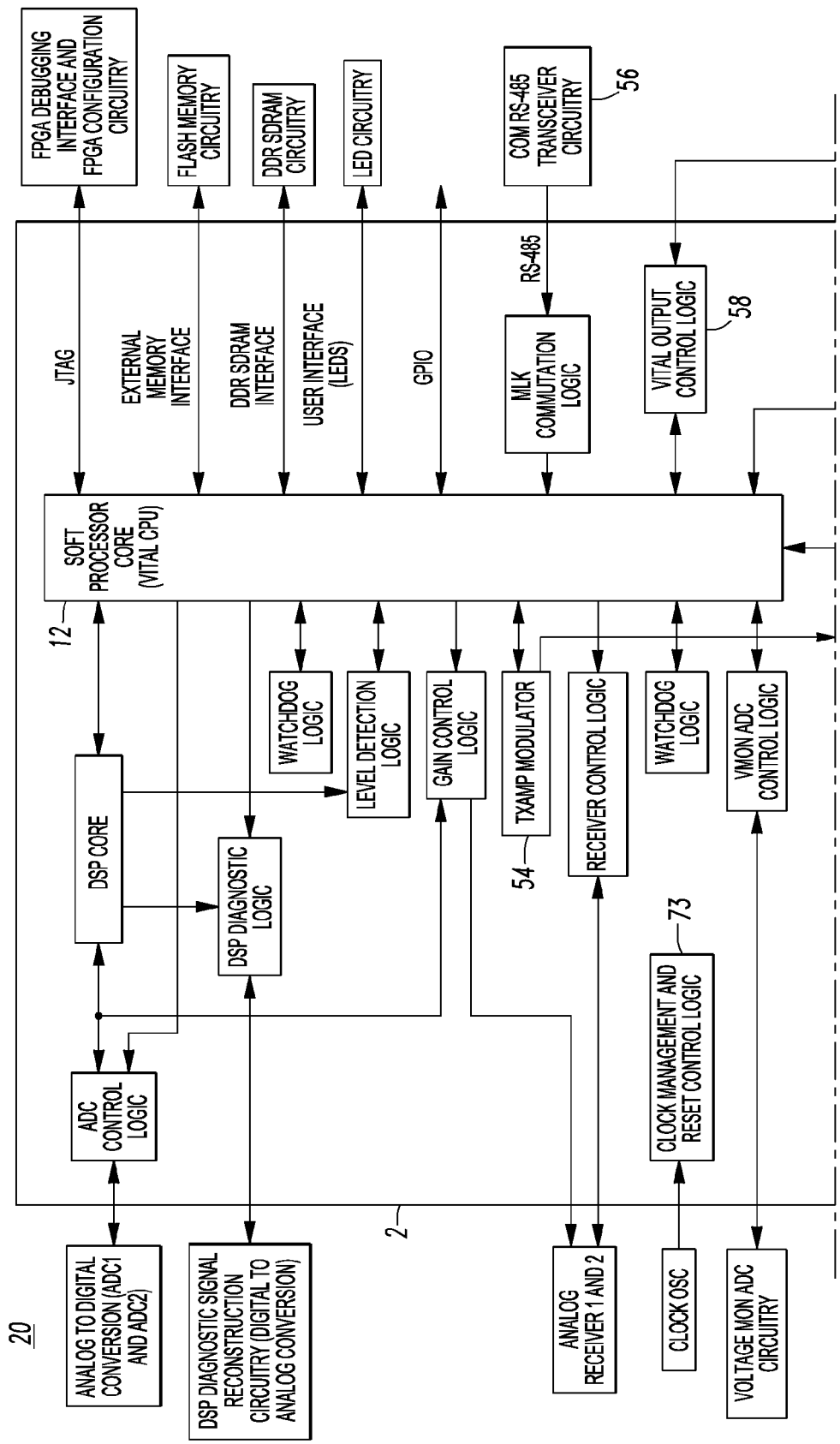
FIGS. 2A-2C form a block diagram of a vital communication system in accordance with other embodiments of the disclosed concept.
Figure 2B:
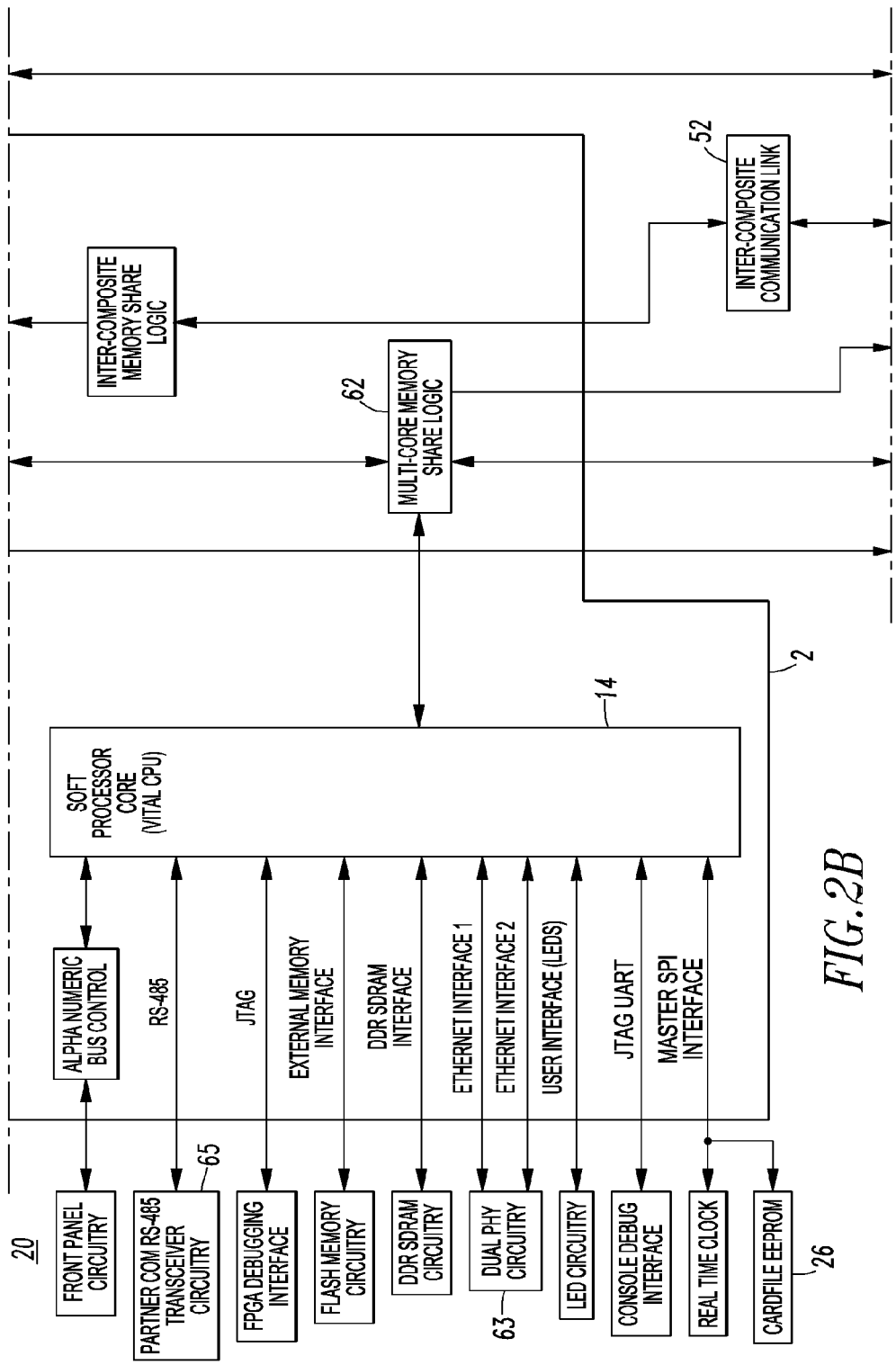
Figure 2C:
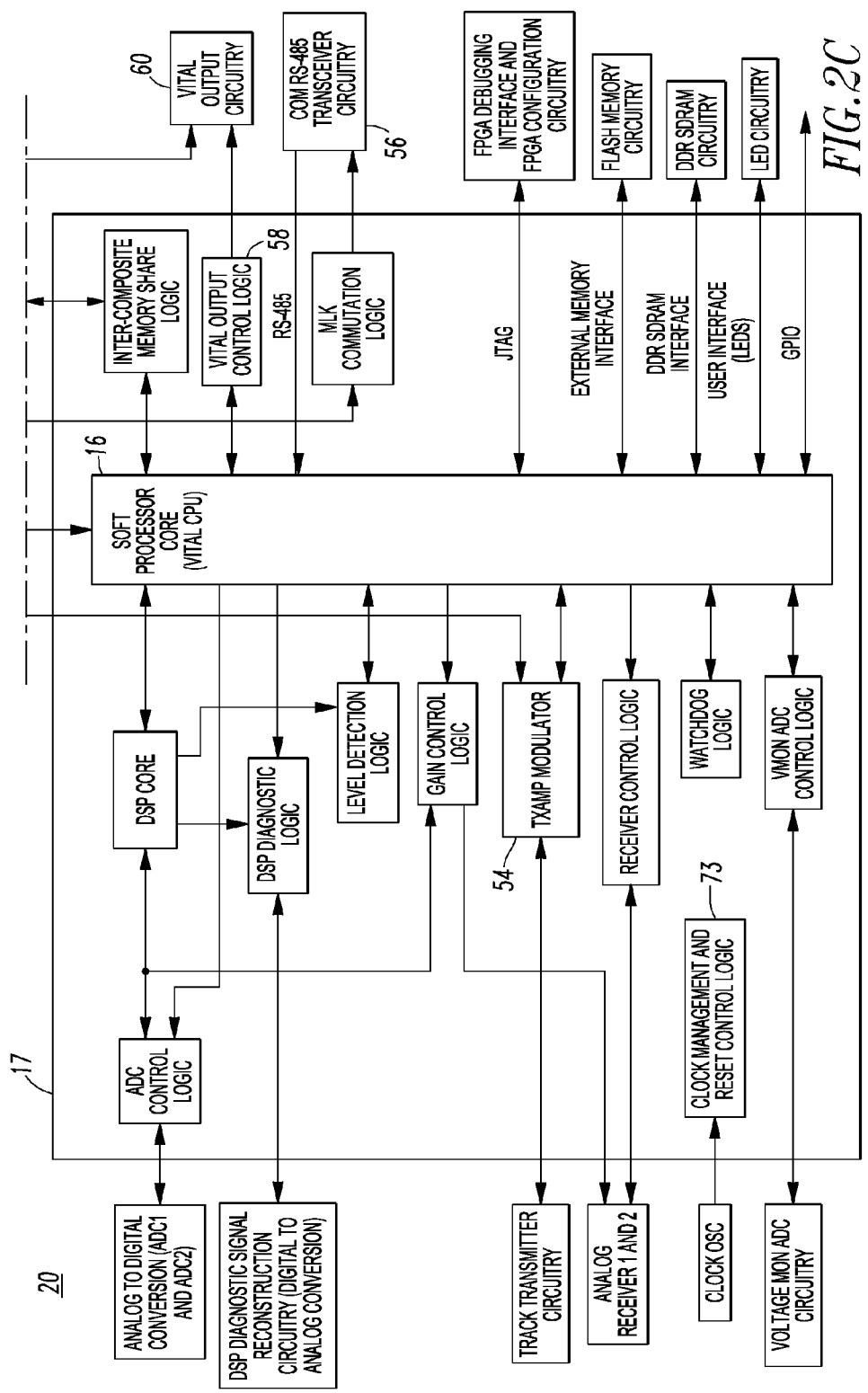

The DPRAM multi-core memory share logic 62 of FIGS. 2A-2C is used for non-vital diagnostic data, non-vital data to/from the cardfile EEPROM 26 (FIG. 1), vital data to/from the partner track circuit 24 (FIG. 1), vital data to/from the interlocking controller 22 in the case of peer protocol (Ethernet), and by a boot system (not shown) for upload and download to/from flash memory. Since the peer protocol incorporates sequence numbers, stale data protection is built into the protocol and the non-vital communications processor 14 is therefore not a factor in transmitting old (stale) data. In the case of MICROLOK® protocol (master/slave RS-485) where there are no message sequence numbers, this interface is not used for vital communications and in its stead is a PHW logic function that incorporates a relatively small buffer (e.g., smaller than half the full message size) such that each vital processor 12,16 has to repeatedly load part of the message information.

Figure 5:
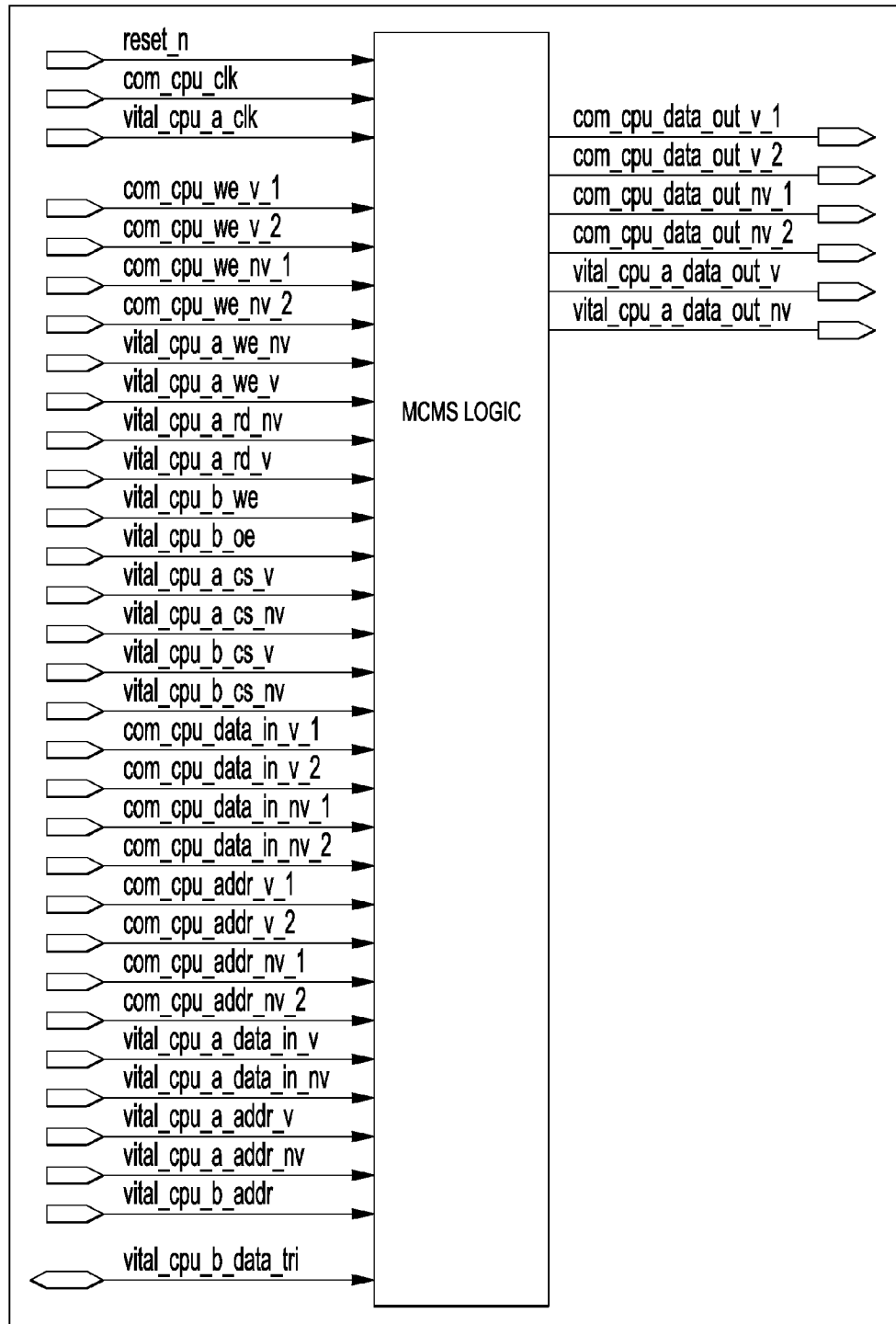
FIG. 5 is signal diagram of the multi-core memory share logic of FIGS. 2A-2C.

The multi-core memory share logic 62 of FIG. 5 facilitates a memory share function between the three processors 12,14, 16. As seen in FIG. 1, the four DPRAMs 30,32,34,36 are implemented between the three processors 12,14,16 to facilitate communication to/from the non-vital communications processor 14 and the vital processors 12,16. The non-vital communications processor 14 has read/write (R/W) access to each of the DPRAMs 30,32,34,36 individually, whereas the vital processors 12,16 have access that is dependent on the type of data. In the case of vital data, the vital processors 12,16 have read-only access to one vital data DPRAM, and write-only access to the another vital data DPRAM. This means that when a vital processor writes vital data to a location, and then performs a read-back access, it reads the other vital data DPRAM since read operations are "criss-crossed". Vital processor write accesses are never "criss-crossed". In the case of non-vital data, the vital processors 12,16 have R/W access to one non-vital data DPRAM, without the "criss-cross" function.

From a hardware standpoint, the vital data DPRAM interfaces are implemented such that the vital processors 12,16 are intentionally writing to one memory while unknowingly reading from the opposing composite item's vital data memory. This allows the vital processors 12,16 to cross check, or vote, on the other composite item's vital data.

As shown in FIG. 1, the non-vital communications processor 14, the vital processor 12, and all DPRAMs 30,32,34,36 are implemented in the first (e.g., without limitation, Altera) FPGA 2. The PHW logic for this component by design prohibits the same vital processor from reading the vital data memory that it has write access to, and instead, it is reading the memory of the opposing composite item.

In terms of the vital processors 12,16 writing data to the interlocking controller 22 via the non-vital communications processor 14, the vital processors 12,16 can write the vital data, and then read back the data from the opposing composite item. If there is agreement, each vital processor writes its half of a cyclic redundancy check (CRC) and then directs the non-vital communications processor 14 to read the data and send it along to the interlocking controller 22. In the case of the vital processors 12,16 reading data from the interlocking controller 22, when the non-vital communications processor 14 receives information from the interlocking controller, the non-vital communications processor 14 simply writes two copies of the received message, one in each vital data DPRAM for each vital processor to read.

For arbitration, software arbitration is employed between the vital processors 12,16 and the non-vital communications processor 14. A series of mailbox registers (FIGS. 9A-9B) are implemented in the DPRAMs 30,32,34,36 to signal from one processor to another when to read a section of data. There is one mailbox 220 per reader/writer pair, per section of data. Take, for example, vital data out to the interlocking controller 22, the first vital processor 12 has one write-only mailbox location that is a read-only location for the non-vital communications processor 14. The vital processor 12 writes this mailbox (providing it is already in agreement with the vital data output from the other vital processor 16) indicating to the non-vital communications processor 14 to read the data out, and transmit to the interlocking controller 22. The key to this arbitration is that reading from the mailboxes is happening at least twice as fast as writing to them.

The other arbitration consideration is the B-side of the vital data DPRAMs 32,34. Since the B-side of the vital data DPRAMs 32,34 only has one physical port 42, both vital processors 12,16 cannot simultaneously access the same vital data DPRAM (i.e., one vital processor cannot read while the other vital processor is writing to the same DPRAM). This arbitration is handled via programmable hardware and software. The PHW provides the software with an indication of a write access on the B-side of the vital data DPRAMs 32,34. With the indication of a write access, the vital processor that is reading can determine if a re-read is necessary. Write accesses are given priority in the event of a simultaneous access. For example, if the vital processor 12 wants to read from DPRAM 34, and it reads the write access indication as being clear, then it then proceeds to read the data out and subsequently, the vital processor 16 begins a write to the B-side of DPRAM 34. The write access is granted priority such that the write is guaranteed, and the read access is retried when the write is complete, or on the next software cycle. The software access algorithm avoids this situation, but this arbitration is implemented such that in the event there is a collision—the behavior is defined as a guaranteed write.

The PHW component provides the multi-core memory share logic 62 for the three processors 12,14,16. This logic component is in both the FPGAs 2,17, but the logic is much different on both sides. The logic 62 of the FPGA 2 provides the fundamental feature of writing to one DPRAM, but unknowingly reading from the other composite item's DPRAM, and also handling the off chip signaling to the vital processor 16 (e.g., using tri-state bus control). On the other side, at the FPGA 17, this component is simply an interface to external memory with programmable wait states.

Figure 4:
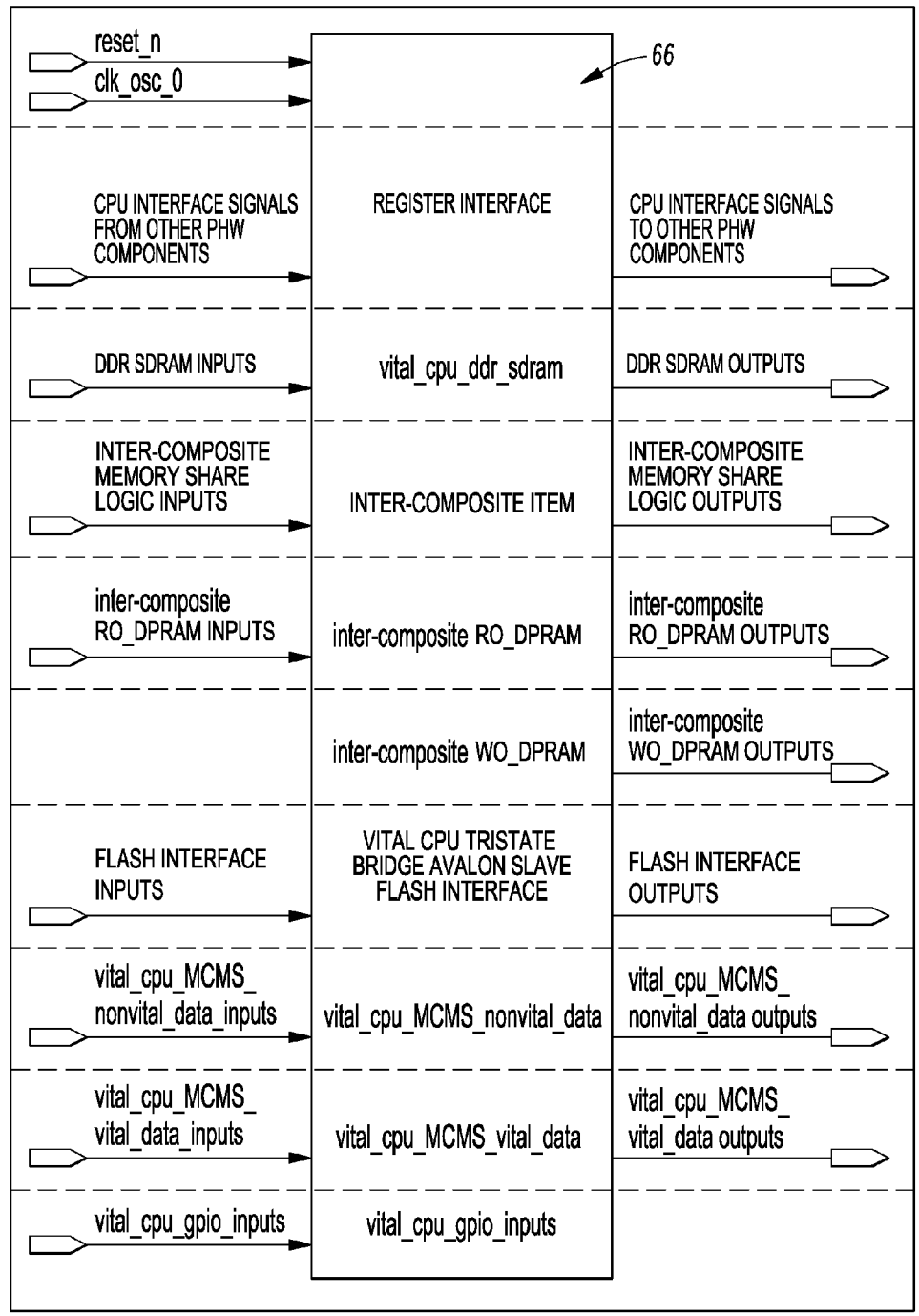
FIG. 4 is a block diagram showing a soft processor core component with decomposition into various PHW modules.

The soft processor core (vital processors 12,16) Safety Integrity Level (SIL) is designated as SIL-0 since the implementation is manufacturer specific and is a diverse implementation across the composite items. The vital processor 12 or 16 is a platform to execute software applications. It also provides hardware and software interfaces to support interfaces with multiple components. The vital processor 12 or 16 is further a platform to run application specific code and control the programmable hardware system. The vital processor 12 or 16 is also responsible for controlling on-chip and off-chip communications. FIG. 4 shows the soft processor core component 64 with decomposition into various PHW modules 66.

Table I shows component level input signals and Table II shows component level output signals for the multi-core memory share logic 62 of FIG. 5. In this example, "Altera" or "Altera CPU" refers to the vital processor 12, "Xilinx" or "Xilinx CPU" refers to the vital processor 16, and "COM CPU" refers to the non-vital communications processor 14.

TABLE I

| Signal Name | Source Component | Description |
|---|---|---|
| reset_n | Clock Management and Reset Control Logic | Asynchronous master reset signal |

TABLE I-continued

| Signal Name | Source Component | Description |
|---|---|---|
| com_cpu_clk | Clock Management and Reset Control Logic | Communication CPU system clock |
| vital_cpu_a_clk | Clock Management and Reset Control Logic | vital CPU A (Altera) system clock |
| com_cpu_we_v_1 | COM CPU | COM CPU write enable to vital data 1 memory |
| com_cpu_we_v_2 | COM CPU | COM CPU write enable to vital data 2 memory |
| com_cpu_we_nv_1 | COM CPU | COM CPU write enable to non-vital data 1 memory |
| com_cpu_we_nv_2 | COM CPU | COM CPU write enable to non-vital data 2 memory |
| vital_cpu_a_we_nv | Altera CPU | Altera vital CPU write enable for non-vital data memory |
| vital_cpu_a_we_v | Altera CPU | Altera vital CPU write enable for vital data memory |
| vital_cpu_a_rd_nv | Altera CPU | Altera vital CPU read enable for non vital data memory |
| vital_cpu_a_rd_v | Altera CPU | Altera vital CPU read enable for vital data memory |
| vital_cpu_b_we | Xilinx CPU | Xilinx vital CPU write enable for non-vital & vital data memory |
| vital_cpu_b_oe | Xilinx CPU | Xilinx vital CPU output enable (read) for non-vital & vital data memory |
| vital_cpu_a_cs_v | Altera CPU | Altera vital CPU chipselect for vital data memory |
| vital_cpu_a_cs_nv | Altera CPU | Altera vital CPU chipselect for non-vital data memory |
| vital_cpu_b_cs_v | Xilinx CPU | Xilinx vital CPU chipselect for vital data memory |
| vital_cpu_b_cs_nv | Xilinx CPU | Xilinx vital CPU chipselect for non-vital data memory |
| com_cpu_data_in_v_1 | COM CPU | Input Data from COM CPU for vital data 1 memory |
| com_cpu_data_in_v_2 | COM CPU | Input Data from COM CPU for vital data 2 memory |
| com_cpu_data_in_nv_1 | COM CPU | Input Data from COM CPU for non-vital data 1 memory |
| com_cpu_data_in_nv_2 | COM CPU | Input Data from COM CPU for non-vital data 2 memory |
| com_cpu_addr_v_1 | COM CPU | Address from COM CPU for vital data 1 memory |
| com_cpu_addr_v_2 | COM CPU | Address from COM CPU for vital data 2 memory |
| com_cpu_addr_nv_1 | COM CPU | Address from COM CPU for non-vital data 1 memory |
| com_cpu_addr_nv_2 | COM CPU | Address from COM CPU for non-vital data 2 memory |
| vital_cpu_a_data_in_v | Altera CPU | Input data from Altera vital CPU for vital data memory |
| vital_cpu_a_data_in_nv | Altera CPU | Input data from Altera vital CPU for non-vital data memory |
| vital_cpu_a_addr_v | Altera CPU | Address from Altera vital CPU for vital data memory |
| vital_cpu_a_addr_nv | Altera CPU | Address from Altera vital CPU for non-vital data memory |
| vital_cpu_b_addr | Xilinx CPU | Address from Xilinx vital CPU for vital & non-vital memory |
| vital_cpu_b_data_tri | Xilinx CPU | Tri state data bus from Xilinx CPU to access vital & non-vital memory |

TABLE II

| Signal Name | Destination Component | Description |
| --- | --- | --- |
| com_cpu_data_out_v_1 | COM CPU | Output data to COM CPU from vital data 1 memory |
| com_cpu_data_out_v_2 | COM CPU | Output data to COM CPU from vital data 2 memory |
| com_cpu_data_out_nv_1 | COM CPU | Output data to COM CPU from non-vital data 1 memory |
| com_cpu_data_out_nv_2 | COM CPU | Output data to COM CPU from non-vital data 2 memory |
| vital_cpu_a_data_out_v | Altera CPU | Output data to Altera vital CPU from vital data memory |
| vital_cpu_a_data_out_nv | Altera CPU | Output data to Altera vital CPU from non-vital data memory |
| vital_cpu_b_data_tri | Xilinx CPU | Tri state data bus from Xilinx CPU to access vital & non-vital memory |

The multi-core memory share logic 62 supports inter-processor communication between the vital processors 12,16 and the non-vital communications processor 14, and also provides arbitration logic that serves sharing the shared memory 4 between these three processors 12,14,16. This logic 62 provides for simultaneous read access from both vital processors 12,16 and likewise provides simultaneous write access from both vital processors 12,16. However, due to the "criss-cross" on read/write, arbitration is provided when one vital processor is reading and the other vital processor is attempting a simultaneous write. A "collision avoidance" mechanism is integrated to avoid this simultaneous read/write condition. Write accesses are buffered such that if a read was already in progress when the write access was requested, the read access is finished first, and then subsequently, the write access occurs after the read access is finished. There is an un-avoidable situation where the write is buffered and the logic detects that no read is in progress and therefore the write access begins. In this situation, if the read access occurs on the exact clock edge that the write starts—the collision is unavoidable, the write is granted priority, and the read access returns all zeros and should therefore be retried or re-synchronized across software cycle boundaries (e.g., wait for the next software cycle). With the collision avoidance mechanism, this "un-avoidable collision" state will be almost completely circumvented (i.e., it will occur at an extremely low probability).

The interface 52 of FIG. 1 facilitates cross-composite item high-speed communication. For example, two control signals, eight data out signals (to the other composite item), and eight data in signals (from the other composite item) to/from the FPGA logic comprise this interface. The FPGA logic handles all control and data serializing/de-serializing to/from the other composite item. Since the interface 52 appears to both vital soft processors as a DPRAM and the CPUs are un-synchronized, the FPGA logic handles semaphores for multiple access, clock domain crossing, and DPRAM interfacing. This is a communication link and not a hardware component, as the only hardware (non PHW) is signal termination.

The system 20 of FIG. 1 supports Ethernet-based communication with the interlocking controller 22 using a suitable peer protocol, which is a vital protocol that includes a CRC for data integrity and a sequence number for stale data protection. The high-level solution used by the system 20 achieves the desired safety integrity level of SIL-4. This solution utilizes a two-out-of-two voting architecture to compile and package a message to be transmitted to the interlocking controller 22, which includes a vital indication of track-circuit occupancy. In addition to the two vital processors 12,16, the third non-vital communications processor 14 transmits the peer protocol message onto the Ethernet network 68. The communications processor 14 handles non-vital communication related functions isolated from the vital processing of the two vital processors 12,16, thereby physically separating vital and non-vital processing. This communications processor 14 has no knowledge of how to form or decode a peer protocol message and simply treats the peer message from the vital processors 12,16 as raw data that is packaged into an Ethernet packet for transmission on the network 68 to the interlocking controller 22.

Each composite item (vital processor 12 or vital processor 16) has the ability to generate the complete message to be sent; however, each is hardware limited to provide only half of the message to its own dedicated area of the shared memory 4 (DPRAMs 30,32,34,36). Each vital processor 12,16 can read the other vital processor's memory area to check that data for validity against its own. The following steps are executed by the system 20 when transmitting a single message to the interlocking controller 22: (1) each vital processor 12,16 assembles the complete message including the CRC that will be sent to the interlocking controller 22 and utilizes inter-composite item communications over interface 52 to synchronize for the message transmission operation; (2) each vital processor 12,16 writes the data portion (no CRC) of the message to its area of the shared memory 4 and is limited in order to provide only part of the data (e.g., vital processor 12 only provides the even bytes to DPRAM_1 32 and vital processor 16 only provides the odd bytes to DPRAM_2 34); and (3) each vital processor 12,16 reads back the other vital processor's data from the shared memory 4 (vital processor 12 reads from DPRAM_2 34, and vital processor 16 reads from DPRAM_1 32) and compares the data to the message it assembled. If the data read back from the other vital processor 12 or 16 is equal to what was expected, the vital processor appends the remaining portion of the message (CRC) to the first part of the message already in the shared memory 4. On the other hand, if the data read back from the other vital processor is not equal to what was expected, the vital processor 12 or 16 writes corrupted data to its corresponding DPRAM 32 or 34 and reverts to a safe state.

If the check of the first part of the message passes, then the complete message is now in shared memory 4 since the vital processors 12,16 have written the rest of their message. Each vital processor 12,16 reads back the other vital processor's complete message from the shared memory 4 and compares the data to the message it assembled. If the data read back from the other vital processor is equal to what was expected, the vital processor 12 or 16 provides an indication to the non-vital communications processor 14 to transmit the message in the buffer. After the communications processor 14 receives the indication from both vital processors 12,16, the processor 14 extracts both halves of the message from the two memories 32,34, appends the halves together to form a complete message, and then transmits the message on the Ethernet network 68 to the interlocking controller 22. Otherwise, if the data read back from the other vital processor is not equal to what was expected, the vital processor 12 or 16 writes corrupted data to its DPRAM 32 or 34, does not provide the indication to the communications processor 14, and reverts to a safe state.

The above sequence of operations allows for each composite item 12,16 to independently prevent transmission of a complete, invalid peer message to the vital interlocking controller 22. Because the peer protocol includes stale data protection, the complete message can be stored for transmission by the communications processor 14. The interlocking controller 22, via the sequence number, checks to detect retransmission of a stale message due to a random fault in the communications processor 14.

The complete received message from the interlocking controller 22 is provided to both of the vital processors 12,16. The communications processor 14 extracts the data from the received Ethernet packet and writes a complete copy of the data to each DPRAM 34,32. Each vital processor 12,16 independently decodes the message and CRC, and compares the results with the other vital processor via inter-composite item communications on interface 52. If there is disagreement between the vital processors 12,16 on the contents of the received message, then they can independently revert to a safe state.

The multi-core memory share (MCMS) logic 62 (FIGS. 5, 6 and 7A-7C) provides for simultaneous read access from both vital processors 12,16 and, likewise, provides simultaneous write access from both vital processors. However, due to the "criss-cross" on read/write to and from DPRAMs 32,34 (best shown in FIG. 1), arbitration is provided when one vital processor 12 or 16 is reading and the other vital processor 16 or 12 is attempting a simultaneous write. A "collision avoidance" mechanism is integrated to avoid this simultaneous read/write condition. Write accesses are buffered such that if a read access was already in progress when a write access was requested, the read access is finished first, and then subsequently, the write access occurs after the read access is finished. There is an unavoidable situation where the write access is buffered and the logic detects that no read access is in progress and, therefore, the write access begins. In this situation, if the read access occurs on the exact clock edge that the write access starts, the collision is unavoidable, the write access is granted priority, and the read access returns all zeros and should, therefore, be retried or re-synchronized across software cycle boundaries (e.g., wait for the next software cycle). With the collision avoidance mechanism, this "unavoidable collision" state will be almost completely circumvented (i.e., it will occur at an extremely low probability).

From a hardware standpoint, the vital data DPRAM interfaces are implemented such that the vital processors 12,16 are intentionally writing to one DPRAM 32 or 34 while unknowingly reading from the opposing composite item's DPRAM 34 or 32. This allows the vital processors 12,16 to cross check, or vote, on the other composite item's vital data.

The DPRAM MCMS logic 62 is used for non-vital diagnostic data, non-vital data to/from the cardfile EEPROM 26, vital data to/from the partner track circuit (TCS) 24, vital data to/from the interlocking controller 22 in the case of peer protocol (Ethernet), and by the boot system (not shown) for upload and download to/from flash memory (FIG. 2A). Since the peer protocol incorporates sequence numbers, stale data protection is built into the protocol and the communications processor 14 is, therefore, not a factor in transmitting old (stale) data. In the case of Microlok® protocol (master/slave RS-485) where there are no message sequence numbers, this interface is not used for vital communications and in its stead is the Microlok® Serial Communication Logic, which incorporates a small buffer (e.g., smaller than half the full message size) such that each vital processor 12,16 has to repeatedly load part of the message information.

The non-vital communications processor 14, one vital processor 12, and all DPRAMs 30,32,34,36 are implemented in the FPGA 2. The PHW logic for this component prohibits the same vital processor 12 or 16 from reading the vital data memory that it has write access to, and, instead, it reads the memory of the opposing composite item.

In terms of the vital processors 12,16 writing data to the interlocking controller 22, the vital processors 12,16 can write the vital data, and then read back the data from the opposing composite item. If there is agreement, each vital processor 12,16 will write its half of the CRC and then direct the communications processor 14 to read the data and send it to the interlocking controller 22. In the case of the vital processors 12,16 reading data from the interlocking controller 22, when the communications processor 14 receives information from the interlocking controller 22, the communications processor 14 simply writes two copies of the received message, one in each vital data DPRAM 34,32 for each respective vital processor 12,16 to read.

Figure 6:
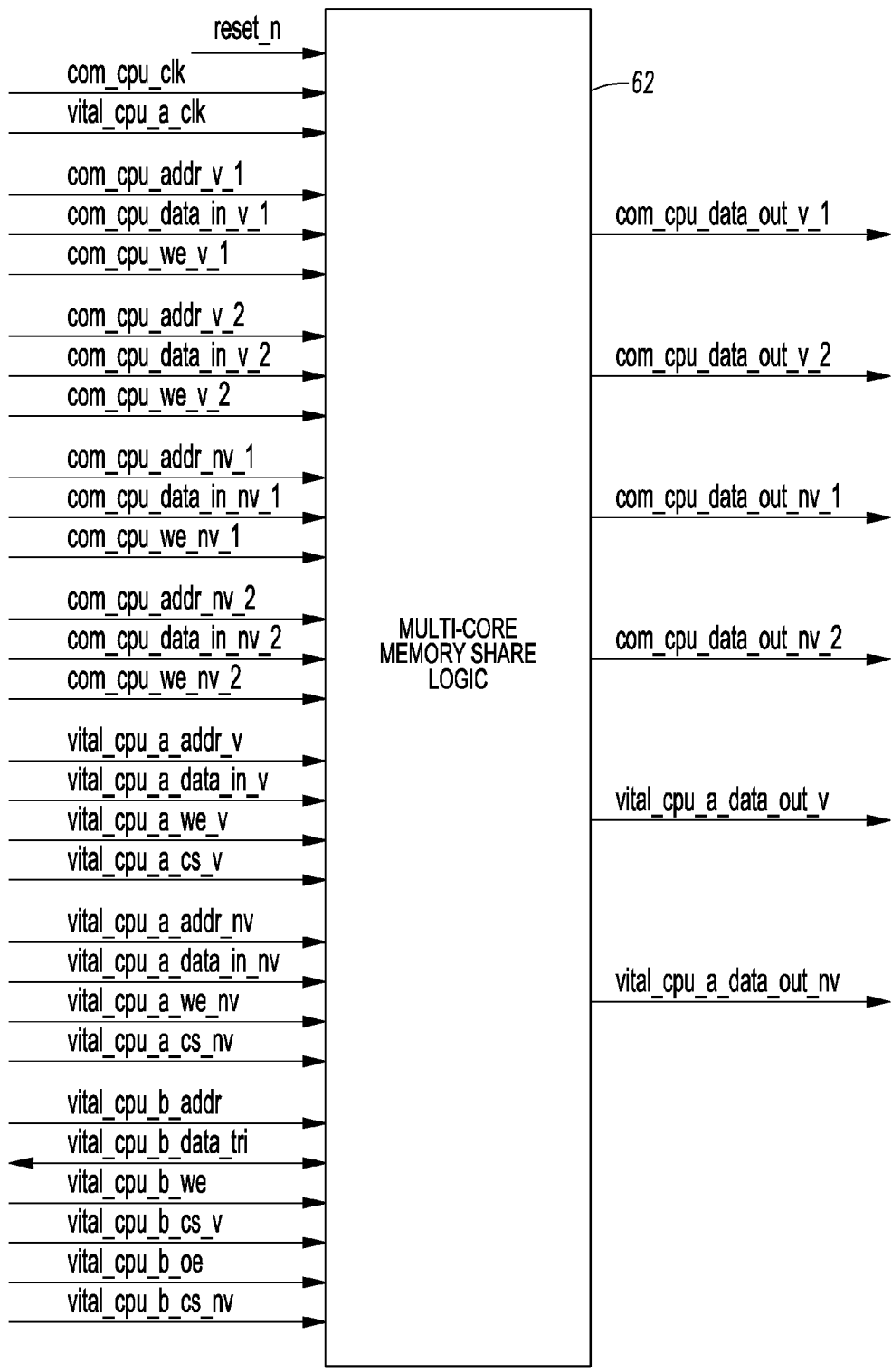
FIG. 6 is a module entity diagram of the multi-core memory share logic of FIGS. 2A-2C.

FIG. 6 shows a module entity diagram for the MCMS logic 62 of FIG. 5. When the signal reset_n is set as logic '0', the input port vital_cpu_b_data_tri and the output port vital_cpu_a_data_out_v are driven to zeros. During a simultaneous write/read by the vital processors (VP 12, VP 16) to either vital DPRAM 32 or 34, the write access is guaranteed. A simultaneous read and write returns all zeros to the vital processor 12 or 16 that is reading. When the vital processor 16 requests a read from DPRAM 32 B-port 42, while a write request from vital processor 12 is in progress, the read operation returns zeros. The read data for vital processor 16 in the case of a read and write collision from DPRAM 32 B-port 42 is all zeros to indicate a known collision.

When vital processor 12 requests a write to DPRAM 32 B-port 42, when a read request from vital processor 16 is in progress, the write is buffered and is executed after the completion of the read operation. When vital processor 16 requests a read from DPRAM 32 B-port 42, when a write request from vital processor 12 is done, the read is executed after the completion of the write operation.

When vital processor 12 requests a read from DPRAM 34 B-port 42, while a write request from vital processor 16 is in progress, the read operation returns zeros. The read data for vital processor 32 in the case of simultaneous read and write from DPRAM 34 B-port 42 is all zeros to indicate a known collision. When vital processor 16 requests a write to DPRAM 34 B-port 42, when a read request from vital processor 12 is in progress, the write is buffered and is executed after the completion of the read operation. When vital processor 12 requests a read from DPRAM 34 B-port 42, when a write request from vital processor 16 is done, the read is executed after the completion of the write operation.

The data bus from vital processor 16 is bi-directional. The MCMS logic 62 ensures that the correct data is driven to the vital processor 16 from the vital and non-vital DPRAMs 32,36. If the vital processor 16 performs a read operation, the data read from the corresponding DRAM 32,36 is presented on the bus; otherwise, a tri-state output is provided, as output to the IO data bus. If the vital processor 16 is reading vital data memory, data is read from DPRAM 32 and vital memory is selected. If the vital processor 16 is reading non-vital data memory, data is read from DPRAM 36 and non-vital data memory is selected. The IO data bus input is always provided to both of the DPRAMs 34 and 36.

The A Port 38 for all the DPRAMs 30,32,34,36 is read and written by the non-vital communications processor 14. The B Port 42 for DPRAM 34 is read by the vital processor 12, and the B Port 42 for DPRAM 32 is written by the vital processor 12. The B Port 40 for DPRAM 30 is written and read by the vital processor 12, and the B Port 40 for DPRAM 36 is written and read by the vital processor 16.

Figure 7A:
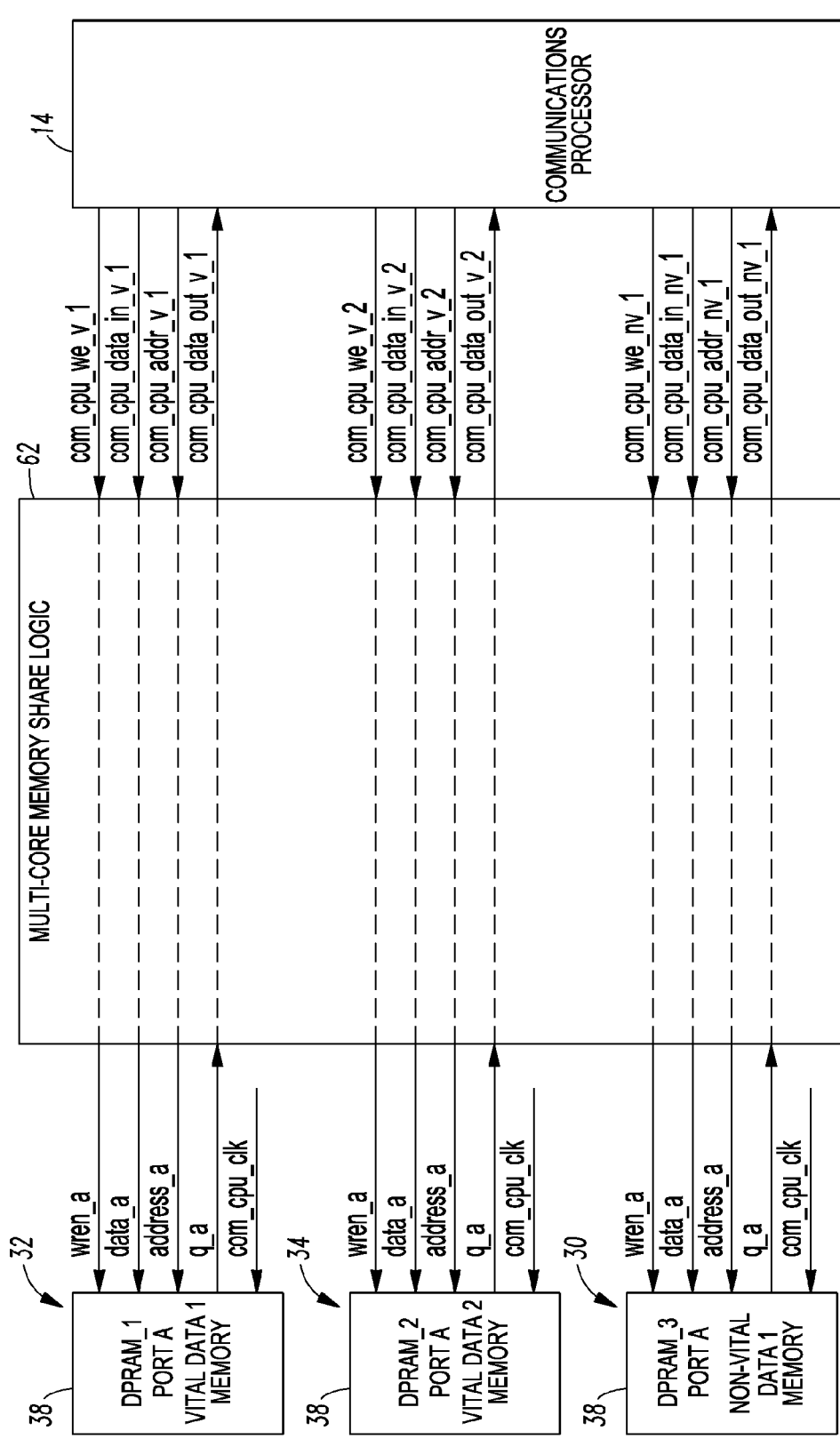
FIGS. 7A-7C form a block diagram of the multi-core memory share logic of FIGS. 2A-2C.
Figure 7B:
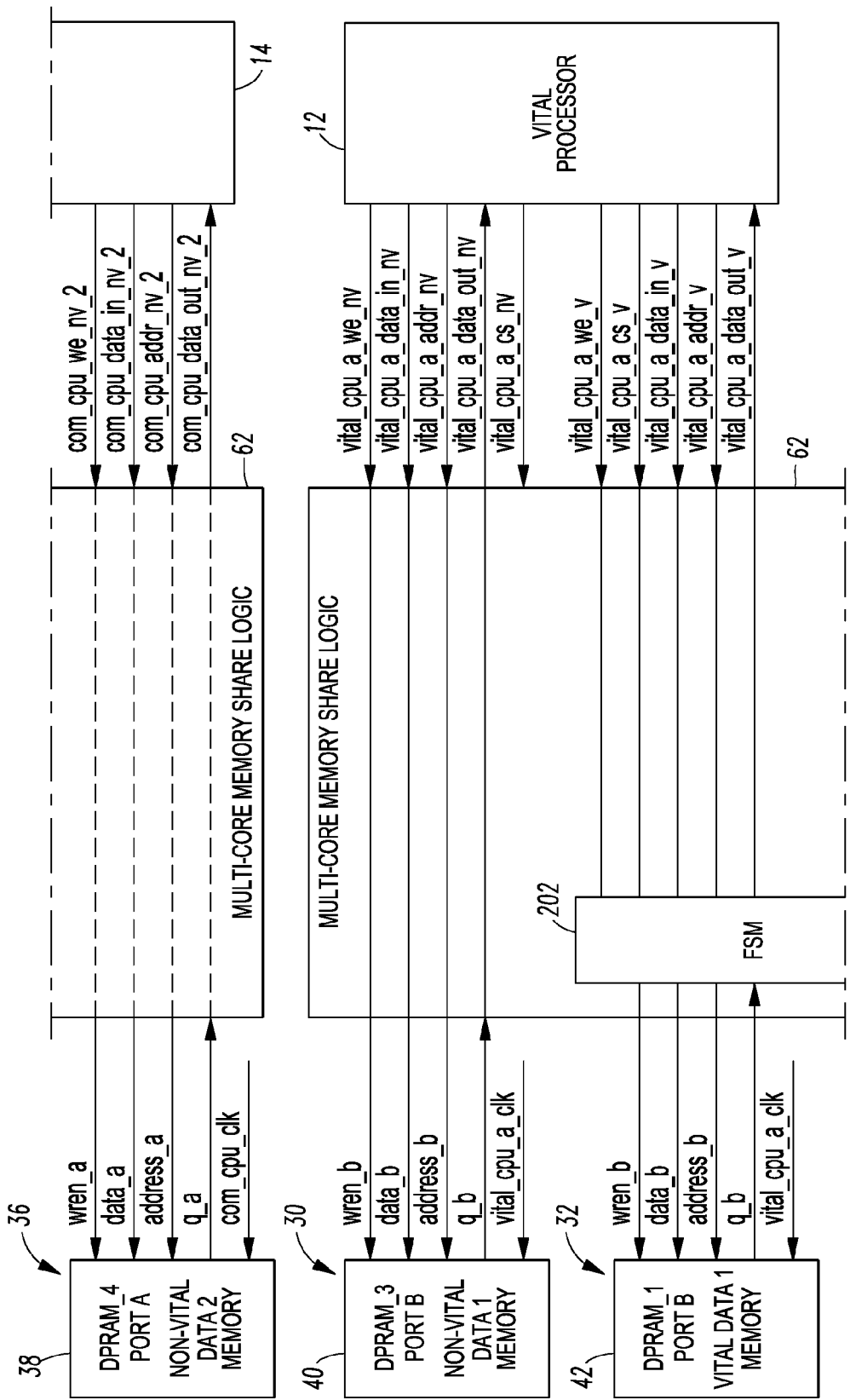
Figure 7C:
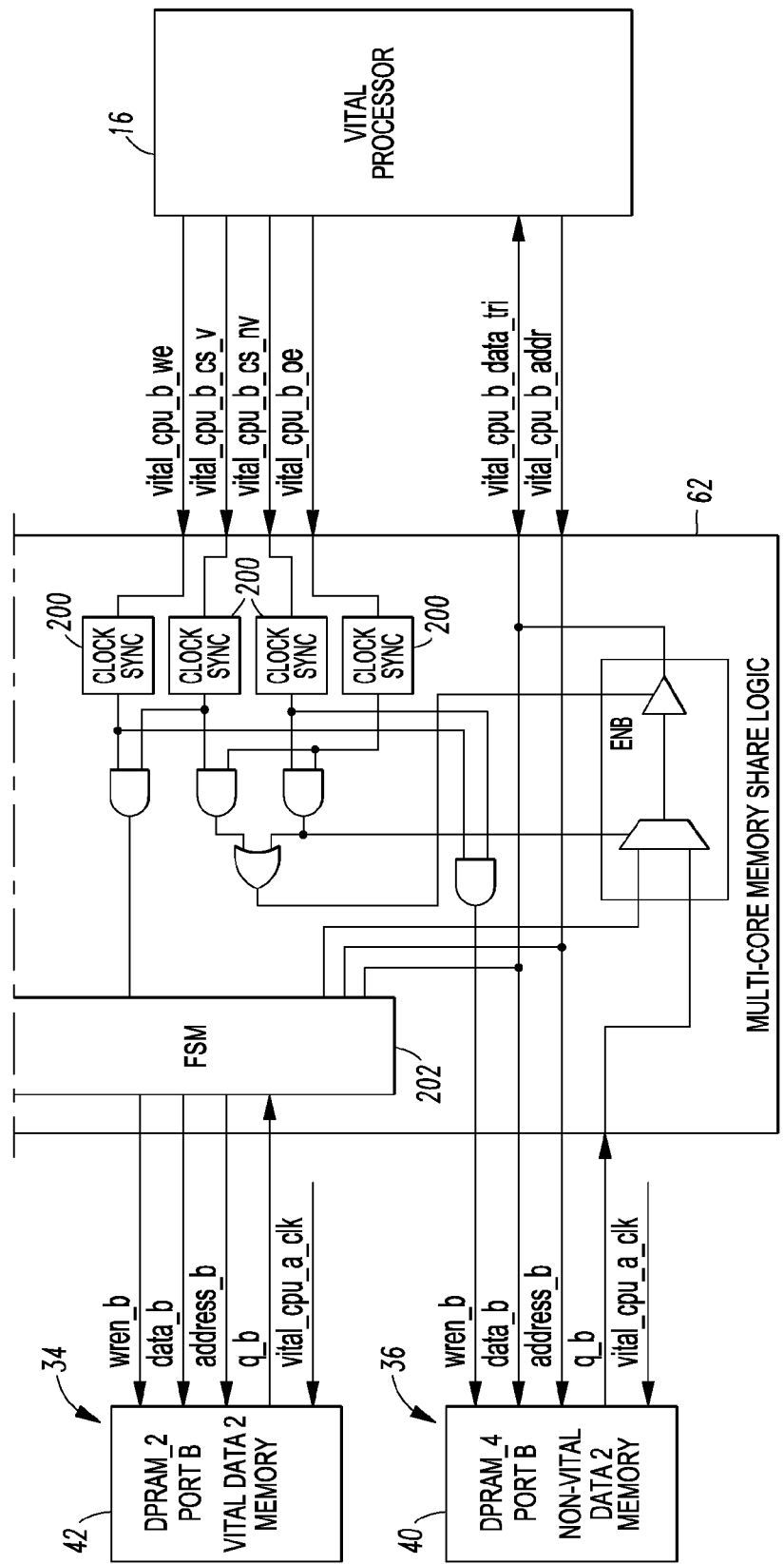

Referring to FIGS. 7A-7C, the implementation architecture for bus arbitration is shown. The MCMS logic 62 arbitrates the data and address bus between the two vital processors 12,16 and the four DPRAMs 30,32,34,36. All four DPRAMs 30,32,34,36 are implemented in the FPGA 2. The vital processor 16 and its memory interface is inside the FPGA 17. The vital processor 12 has two sets of memory interface signals, one for accessing non-vital DPRAM 30 and the other for accessing vital DPRAM 32. The vital processor 16 has only one set of memory interface signals to access both non-vital DPRAM 36 and vital DPRAM 34. The vital processor 16 provides two chip select signals, one for accessing DPRAM 36 and the other for accessing DPRAM 34. Port A 38 for all the DPRAMs 30,32,34,36 is read and written by the non-vital communications processor 14. The Port A DPRAM clock is the clock of the non-vital communications processor 14.

The Port B DPRAM clock is the clock of the vital processor 12. All memory interface signals of the vital processor 16 are synchronized to the clock of the vital processor 12 by clock synchronization (synch) circuits 200.

The DPRAM 32 (vital data) Port B 42 is read by vital processor 16 and written by the vital processor 12.

The DPRAM 34 (vital data) Port B 42 is read by vital processor 12 and written by vital processor 16.

The DPRAM 30 (non-vital data) Port B 40 is read and written by vital processor 12.

The DPRAM 36 (non-vital data) Port B 40 is read and written by vital processor 16.

If both read and write operations are requested on Port B 42 for DPRAM 32 or DPRAM 34, then the write operation has the higher priority. When this happens, the read data is invalid and the output is all zeros.

Figure 8:
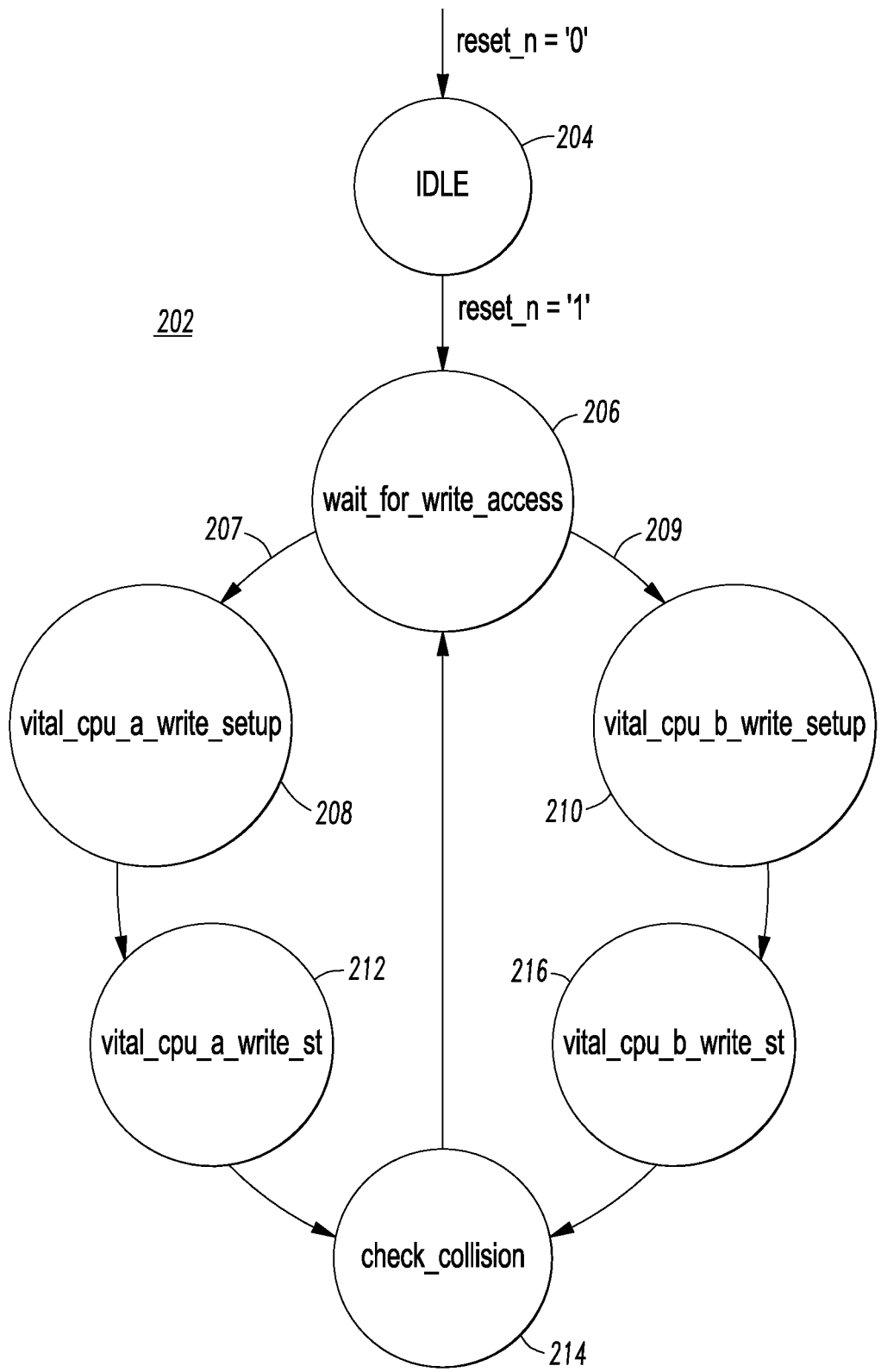
FIG. 8 is a flowchart of states of the finite state machine of FIGS. 7A-7C.

The arbitration for read and write functions for Port B 42 for vital DPRAMs 32 and 34 is controlled by a finite state machine (FSM) 202. The FSM 202, which controls the read-write arbitration for the vital DPRAM B port 42, is shown in FIG. 8. The FSM 202 starts in "idle" state 204 following reset by reset_n=0. The FSM 202 transitions to "wait_for_write_access" 206 following the reset and waits for a write request from one of the vital processors 12,16. When in this state 206, reads from DPRAM 32 and DPRAM 34 are valid and can happen simultaneously. Both vital processors 12 and 16 can read from respective vital data DPRAMs 34 and 32 at the same time. If neither vital processor 12 or 16 is reading vital data DPRAM 34 or 32, and a write request is received from vital processor 12 at 207, the FSM 202 transitions to the "vital_cpu_a_write_setup" state 208. If a write request is received from the vital processor 16 at 209, then the FSM 202 transitions to the "vital_cpu_b_write_setup" state 210.

In the "vital_cpu_a_write_setup" state 208, the DPRAM 32 is setup with address and buffered data from vital processor 12. A read access could start here and collide with the write access, so the read access returns all zeros to indicate a known collision. The FSM 202 then transitions to the "vital_cpu_a_write_st" state 212 where data is written to the DPRAM 32. The FSM 202 then transitions to the "check_collision" state 214.

In the "vital_cpu_b_write_setup" state 210, the DPRAM 34 is setup with address and buffered data from the vital processor 16. A read access could start here and collide with the write access so the read access returns all zeros to indicate a known collision. The FSM 202 then transitions to the "vital_cpu_b_write_st" state 216 where data is written to the DPRAM 34. The FSM 202 then transitions to the "check_collision" state 214.

In the "collision" state 214, the FSM 202 checks if a read occurred during a write (i.e., a collision) and stays in this state until the read becomes inactive. During a read-write collision, the data is held at zero to indicate a known collision.

Figure 9A:
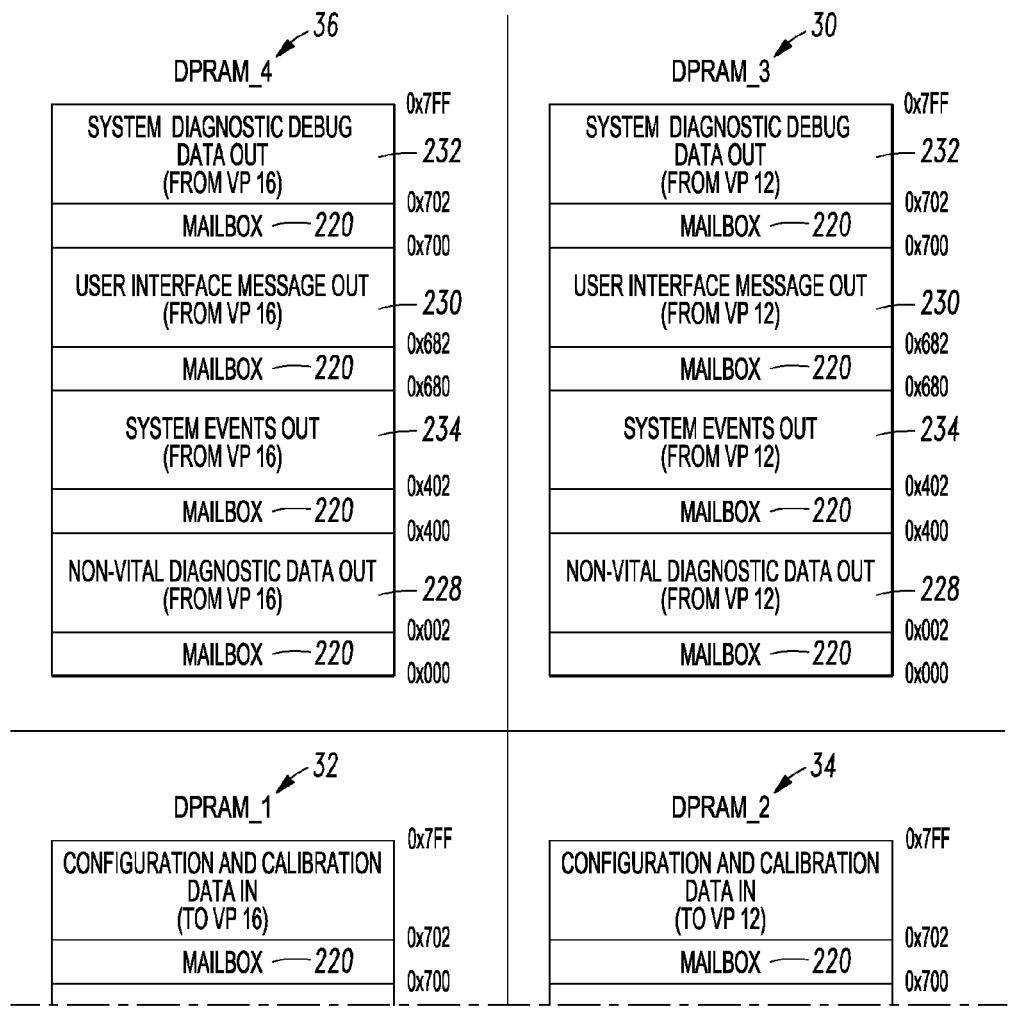

FIGS. 9A-9B show the memory map of the shared memory 4 including the four DPRAMS 30,32,34,36. Each area of these DPRAMs has its own two-byte mailbox 220 to use for arbitration of the corresponding DPRAM. The mailbox 220 is the first two bytes (offset 0x0 and 0x1) in the corresponding memory area, and has the format where bit zero of the first byte is a Busy Flag (active low), and the second byte is a Sequence Number (0x00 to 0xFF). The mailbox 220 is read-only or write-only depending on the non-vital communications processor 14 access to the corresponding area.

For arbitration of read-only areas, the vital processors 12,16 poll the mailbox 220 of each read-only area periodically (e.g., at least every 20 mS). When polling each of the read-only mailboxes 220, the vital processors 12,16 perform the following sequence of operations: (1) check the Busy Flag; if the flag is clear (busy), then this area of the DPRAM is currently being updated by the other vital processor and do nothing this polling cycle; (2) if the Busy Flag is set (not busy), check the Sequence Number; if the Sequence Number has not incremented since the last read polling of the mailbox 220, the data is stale; do nothing this polling cycle; and (3) if the Sequence Number has incremented since the last polling cycle of the mailbox 220, the data is fresh; extract the data from the corresponding area, as needed, and process the data.

For arbitration of write-only areas, in order to prevent the writing of data to a DPRAM area while the non-vital communications processor 14 and opposite composite-item processor 16 or 12 is reading from the corresponding area, the vital processor 12 or 16 does not write data to a write-only area of the DPRAM at a rate of more than a predetermined time (e.g., no more than once every 50 mS). When writing new data to the corresponding area in the DPRAM, each vital processor 12,16 uses the mailbox 220 of the area as follows: (1) clear the Busy Flag; (2) write the new data to the area as needed; (3) increment the Sequence Number to the next value; and (4) set the Busy Flag.

For vital processor 12 or 16 to non-vital communications processor 14 communication, the vital processor software supplies any new data to be communicated to the communications processor 14 in the shared memory 4. In arbitrating access to this interface, the vital processor software updates the corresponding DPRAM 30 or 36 with a complete message at a rate no faster than a first predetermined time (e.g., no more than once every 50 mS) while the communications processor 14 polls the DPRAM at least once per a smaller second predetermined time (e.g., at least every 20 mS). The vital processors 12,16 use the mailbox Sequence Number and Busy Flag to indicate when the communications processor 14 is to process the message in the shared memory 4. When the Sequence Number in the mailbox 220 is changed and the Busy Flag is not asserted, the communications processor 14 processes the message data within the interface.

As the vital messages of the two vital processors 12,16 need to be combined into a single message to the communications processor 14, a safe method is used such that both vital processors 12,16 agree on the single message which is protected with a CRC. The vital messages that employ this method include the vital interlocking peer message out and the partner track circuit message out.

Other messages sent from the vital processors 12,16 to the communications processor 14 include EEPROM data out, non-vital diagnostic data out, user interface data, system debug data and system events. The EEPROM data, though used vitally, does not employ the combination of data from both vital processors 12,16 into a single message as does the other vital communication transmit messages. Instead, two complete copies of the data can be stored in the EEPROM, one from the one vital processor 12 and one from the other vital processor 16, each protected with a CRC. When either vital processor 12 or 16 retrieves the EEPROM data, they each can get both copies for comparison to assure safety.

The DPRAMs 30,32,34,36 are provided with a Peer Tx Buffer 222, Partner Tx Buffer 224, EEPROM write buffer 226, Non-vital Diagnostic Data buffer 228, User Interface buffer 230, System Debug Data buffer 232 and System Events buffer 234. Each of these buffers has appended a Sequence Number to indicate when the data has changed and needs to be written to the corresponding DPRAM. The vital processors 12,16 assure that the corresponding DPRAM will not be updated more often than the example predetermined time (e.g., 50 mS). It is not necessary to update the DPRAM at all when the input data buffers have not changed. It is not necessary for the shared memory 4 to buffer inputs for the case that the input data changes more often than this predetermined time. The components which provide the buffers to the shared memory 4 are responsible for limiting how often the buffers change, if needed.

Each DPRAM buffer location for each message is updated using the appropriate algorithms as discussed below. For each type of message, the DPRAM component sets a unique type ID at the start of the message and a unique terminator at the end to indicate to the communications processor 14 the corresponding message type. The data length is also added to the message buffer.

For a non-vital message, when the vital processors 12,16 determine an EEPROM-out, non-vital-diagnostic-data-out, user interface data, system debug data or that system events messages need to be updated, the vital processor 12 or 16 first sets the Busy Flag in its message mailbox 220. The message data is then updated in the shared memory 4. Then, the Sequence Number in the message mailbox 220 is incremented from the previous message value and updated in the register. Finally, the Busy Flag in the mailbox 220 is cleared indicating to the communications processor 14 that a new message is available for processing. Each of these messages is treated independently with their own mailbox 220 such that only messages that need updating will be updated as opposed to updating all non-vital DPRAM messages.

For a vital message, each vital processor 12,16 has write access to only half of the data to be transmitted. The vital processor 12 has write access to the odd bytes of the message while the vital processor 16 has write access to the even bytes.

Each vital processor 12,16 then has read access to the opposite bytes. The vital processor 16 reads even bytes and the vital processor 12 reads odd bytes. The algorithm for writing the vital data is intended to be completed across multiple software cycles. The software component latches the input message data such that the input message remains unchanged until the writing algorithm is completed. The input Tx buffer to the component contains the message, message size and the index of the beginning of the message protection (start of the CRC).

The non-vital communications processor 14 communicates vital information with the interlocking controller 22, and configuration, calibration, and diagnostic information with a signaling engineer via the user interface 28. The processor 14 is dedicated to non-vital communications processing and includes dedicated volatile and non-volatile memory for program storage and execution independent of the vital processing by vital processors 12,16. The majority of the communications and user interface functionality is handled by the processor 14.

The processor 14 includes support of a peer protocol over Ethernet for communications to/from the interlocking controller 22. The assembly of vital peer messages is handled by the vital processors 12,16, and passed on to the processor 14 when complete. The processor 14 then packages the peer message as an Ethernet packet for transmission on the network 68 by an Ethernet controller 63 (FIGS. 2A-2C). Received Ethernet packets are stripped of the Ethernet data by the processor 14 and the peer message data is provided to the vital processors 12,16 for processing.

The processor 14 includes support of the MICROLOK® master/slave protocol over Ethernet for communications to/from the interlocking controller 22. This support is included to be compatible with existing installations. The assembly of the vital MICROLOK® serial messages is handled by the vital processors 12,16, and then sent to a RS-485 UART and transceiver 65 (FIGS. 2A-2C) for transmission to the interlocking controller 22. The RS-485 UART provides received serial messages directly to the vital processors 12,16. The master/slave protocol does not include embedded stale data protection, and therefore this interface cannot utilize the non-vital processor 14 for message transmission.

The system 20 supports a redundant track circuit system. In order to support this redundancy, an RS-485 communication link is provided for comparison of data between online and standby track circuits. The assembly of the vital partner track circuit message is handled by the vital processors 12,16, and passed on to the non-vital communications processor 14 when complete. The processor 14 then transmits the serial message to the partner track circuit 24 using the RS-485 UART and transceiver 65 (FIGS. 2A-2C). Received serial messages from the partner track circuit 24 are provided to the vital processors 12,16 for processing by the processor 14.

The system 20 stores configuration and calibration data for the location in the cardfile EEPROM 26 (e.g., a serial EEPROM device located in the cardfile). The assembly of the vital data to be stored is handled by the vital processors 12,16, and is passed on to the non-vital communications processor 14 when complete. The processor 14 then writes the data to the EEPROM 26 for storage. At power-up, the vital processors 12,16 request the configuration and calibration data, and the processor 14 then extracts the data from the EEPROM 26 and provides it to the vital processors 12,16. The processor 14 also stores and retrieves data to/from the EEPROM 26.

The system 20 supports configuration, calibration, software upload/download, and viewing of diagnostic/event data via a web-based interface. The non-vital communications processor 14 includes an embedded web server to host this interface so that a signaling engineer can connect to a TCS with a notebook computer and an Internet browser. Configuration and calibration functions within this interface are protected from un-authorized user access with the use of an access password and the requirement that the maintainer be in close proximity of the system 20 (via the use of a front panel interlock (not shown)). Data received from this interface for calibration and configuration of the track circuit is sent to the vital processors 12,16 for processing. Diagnostic data is also be available to a remote user in the form of SNMP messages, also hosted by the processor 14.

The system 20 supports configuration, calibration, and viewing of diagnostic/event data via the user interface 28 (e.g., a front panel interface). This interface 28 employs, for example and without limitation, alphanumeric displays and toggle switches to allow for a signaling engineer to interface with the TCS without the use of a PC. Configuration and calibration functions within this interface are protected from un-authorized user access with the use of password protection. The processor 14 processes this interface and sends data received from this interface for calibration and configuration of the track circuit to the vital processors 12,16.

In summary, interface and communications functions are typically complex and slow. This places a significant burden upon a processor that should be handling real-time vital tasks. By separating these functions into vital and non-vital tasks, and assigning them to two separate processors that are optimized to perform their tasks, a significant improvement in sub-system simplification is realized that results in shorter development time and improved real-time performance. All of these benefits are realized at little or no reoccurring cost. An additional benefit comes when the system 20 is subjected to a safety assessment. Both of the vital processor 12 and the non-vital communications processor 16 are included in the single programmable logic apparatus 2, such as the example FPGA. The clear separation of the vital 12,16 and non-vital 14 functions makes it easier to prove that non-vital tasks cannot affect vital operation in an unsafe manner.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A programmable logic apparatus comprising:
    a shared memory comprising a first port, a second port and a third port;
    a first vital processor interfaced to the first port of said shared memory; and
    a non-vital communications processor separated from said first vital processor in said programmable logic apparatus and interfaced to the second port of said shared memory,
    wherein the third port of said shared memory is an external port structured to interface an external second vital processor,
    wherein said shared memory further comprises a first memory and a second memory;
    wherein each of said first memory and said second memory comprises a first port and a second port;
    wherein the first ports of the first memory and the second memory are part of the second port of said shared memory;
    wherein the second port of the first memory is part of the first and third ports of said shared memory;
    wherein the second port of the second memory is part of the first and third ports of said shared memory; and
    wherein both of said first vital processor and said external second vital processor are structured to cooperatively agree that first data in said first memory corresponds to second data in said second memory, and responsively cause said non-vital communications processor to employ part of said first data and part of said second data as third data, and to output serial data based upon said third data.

2. The programmable logic apparatus of claim 1 wherein said programmable logic apparatus is a single field programmable gate array.

3. The programmable logic apparatus of claim 1 wherein said non-vital communications processor is structured to communicate with at least one of an interlocking controller using a peer protocol or a master/slave protocol, a partner track circuit, a configuration data storage device, and a user interface.

4. A programmable logic apparatus comprising:
    a shared memory comprising a first port, a second port and a third port;
    a first vital processor interfaced to the first port of said shared memory; and
    a non-vital communications processor separated from said first vital processor in said programmable logic apparatus and interfaced to the second port of said shared memory,
    wherein the third port of said shared memory is an external port structured to interface an external second vital processor,
    wherein said shared memory comprises a first memory, a second memory, a third memory and a fourth memory; wherein each of said first memory, said second memory, said third memory and said fourth memory comprises a first port and a second port; wherein the first ports of the first memory, the second memory, the third memory and the fourth memory are part of the second port of said shared memory; wherein the second port of the first memory is part of the first port of said shared memory; wherein the second port of the second memory is part of the first and third ports of said shared memory; wherein the second port of the third memory is part of the first and third ports of said shared memory; and wherein the second port of the fourth memory is part of the third port of said shared memory.

5. The programmable logic apparatus of claim 4 wherein the first ports of the first memory, the second memory, the third memory and the fourth memory are structured to permit read or write operations by said non-vital communications processor; wherein the second port of the first memory is structured to permit read or write operations by said first vital processor; wherein the second port of the second memory is structured to permit write operations by said first vital processor and read operations by said external second vital processor; wherein the second port of the third memory is structured to permit read operations by said first vital processor and write operations by said external second vital processor; and wherein the second port of the fourth memory is structured to permit read or write operations by said external second vital processor.

6. The programmable logic apparatus of claim 4 wherein both of said first vital processor and said external second vital processor are structured to cooperatively agree that first data in said second memory corresponds to second data in said third memory, and responsively cause said non-vital communications processor to employ: (a) one of said first data and said second data as third data, or (b) part of said first data and part of said second data as said third data, and to output serial data based upon said third data.

7. The programmable logic apparatus of claim 1 wherein said first vital processor is diverse with respect to said external second vital processor.

8. The programmable logic apparatus of claim 7 wherein said external second vital processor is a field programmable gate array.

9. The programmable logic apparatus of claim 1 wherein said external second vital processor is a field programmable gate array.

10. The programmable logic apparatus of claim 1 wherein said shared memory separates said first vital processor from said non-vital communications processor.

11. A system comprising:
a programmable logic apparatus comprising:
a shared memory comprising a first port, a second port and a third port,
a first vital processor interfaced to the first port of said shared memory, and
a non-vital communications processor separated from said first vital processor in said programmable logic apparatus and interfaced to the second port of said shared memory; and
a second vital processor external to said programmable logic apparatus,
wherein the third port of said shared memory is an external port interfacing said second vital processor,
wherein said shared memory further comprises a first memory and a second memory;
wherein each of said first memory and said second memory comprises a first port and a second port;
wherein the first ports of the first memory and the second memory are part of the second port of said shared memory;
wherein the second port of the first memory is part of the first and third ports of said shared memory;
wherein the second port of the second memory is part of the first and third ports of said shared memory; and
wherein both of said first vital processor and said second vital processor are structured to cooperatively agree that first data in said first memory corresponds to second data in said second memory, and responsively cause said non-vital communications processor to employ part of said first data and part of said second data as third data and to output serial data based upon said third data.

12. The system of claim 11 wherein said programmable logic apparatus is a single field programmable gate array.

13. The system of claim 11 wherein said non-vital communications processor is structured to communicate with at least one of an interlocking controller using a peer protocol or a master/slave protocol, a partner track circuit, a configuration data storage device, and a user interface.

14. A system comprising:
a programmable logic apparatus comprising:
a shared memory comprising a first port, a second port and a third port,
a first vital processor interfaced to the first port of said shared memory, and
a non-vital communications processor separated from said first vital processor in said programmable logic apparatus and interfaced to the second port of said shared memory; and
a second vital processor external to said programmable logic apparatus,
wherein the third port of said shared memory is an external port interfacing said second vital processor,
wherein said shared memory comprises a first memory, a second memory, a third memory and a fourth memory; wherein each of said first memory, said second memory, said third memory and said fourth memory comprises a first port and a second port; wherein the first ports of the first memory, the second memory, the third memory and the fourth memory are part of the second port of said shared memory; wherein the second port of the first memory is part of the first port of said shared memory; wherein the second port of the second memory is part of the first and third ports of said shared memory; wherein the second port of the third memory is part of the first and third ports of said shared memory; and wherein the second port of the fourth memory is part of the third port of said shared memory.

15. The system of claim 14 wherein the first ports of the first memory, the second memory, the third memory and the fourth memory are structured to permit read or write operations by said non-vital communications processor; wherein the second port of the first memory is structured to permit read or write operations by said first vital processor; wherein the second port of the second memory is structured to permit write operations by said first vital processor and read operations by said second vital processor; wherein the second port of the third memory is structured to permit read operations by said first vital processor and write operations by said second vital processor; and wherein the second port of the fourth memory is structured to permit read or write operations by said second vital processor.

16. The system of claim 11 wherein said first vital processor is diverse with respect to said second vital processor.

17. The system of claim 16 wherein said second vital processor is a field programmable gate array.

18. The system of claim 11 wherein said second vital processor is a field programmable gate array.

19. The system of claim 11 wherein said shared memory separates said first vital processor from said non-vital communications processor.

20. The system of claim 11 wherein said programmable logic apparatus is a first field programmable gate array; and wherein said second vital processor is a separate second field programmable gate array.

* * * * *